US007758423B2

(12) United States Patent
Foster et al.

(10) Patent No.: US 7,758,423 B2
(45) Date of Patent: Jul. 20, 2010

(54) GAMING UNITS WITH AN ENHANCED GROUP BONUS ROUND

(75) Inventors: William J. Foster, Reno, NV (US); Kirk Tedsen, Reno, NV (US)

(73) Assignee: IGT, Reno, NV (US)

( * ) Notice: Subject to any disclaimer, the term of this patent is extended or adjusted under 35 U.S.C. 154(b) by 873 days.

(21) Appl. No.: 10/401,662

(22) Filed: Mar. 28, 2003

(65) Prior Publication Data

US 2004/0204226 A1 Oct. 14, 2004

(51) Int. Cl.
*A63F 9/24* (2006.01)
*A63F 13/00* (2006.01)

(52) U.S. Cl. ............................ 463/31; 463/29; 463/30; 463/42

(58) Field of Classification Search ............. 463/16–22, 463/25–28, 29, 40–42, 31; 273/143 R
See application file for complete search history.

(56) References Cited

U.S. PATENT DOCUMENTS 4,837,728 A 6/1989 Barrie et al.
5,580,309 A * 12/1996 Piechowiak et al. ........... 463/16
5,851,148 A 12/1998 Brune et al.
5,876,284 A 3/1999 Acres et al.
5,989,121 A 11/1999 Sakamoto
6,019,374 A 2/2000 Breeding
6,146,273 A * 11/2000 Olsen .......................... 463/27
6,217,448 B1 4/2001 Olsen
6,312,332 B1 11/2001 Walker et al.
6,325,375 B1 12/2001 Potter et al.
6,358,147 B1 3/2002 Jaffe et al.
6,361,441 B1 * 3/2002 Walker et al. ................. 463/42
6,364,768 B1 * 4/2002 Acres et al. ................... 463/25

(Continued)

FOREIGN PATENT DOCUMENTS

EP 1 291 829 3/2003

(Continued)

OTHER PUBLICATIONS

"Polling vs. Interrupt", from www.everything2.com/e2node/Polling%2520vs.%2520interrupt, created Wed Sep. 20, 2000 at 20:00:49.*

(Continued)

*Primary Examiner*—John M. Hotaling
*Assistant Examiner*—Steven J. Hylinski
(74) *Attorney, Agent, or Firm*—Armstrong Teasdale LLP

(57) ABSTRACT

A group bonus round game may be played on a gaming system comprising a plurality of gaming units connected together to form a networked gaming system. Each of the gaming units having a light device located thereon, wherein the light device is adapted to display a bonus indicia. The group bonus game includes the generation of a display of bonus indicia on a first subset of the gaming units, and subsequently a second subset of the gaming units, wherein the display of the bonus indicia on the different subsets of gaming units creates an illusion that the bonus indicia are spinning, or revolving through the gaming system before stopping at a specific gaming unit. The group bonus round may additionally utilize music and/or bonus stages to create other bonus round gaming themes, for example a "musical chairs" type group bonus round.

37 Claims, 18 Drawing Sheets

U.S. PATENT DOCUMENTS

| | | | | |
|---|---|---|---|---|
| 6,375,567 | B1 * | 4/2002 | Acres | 463/25 |
| 6,375,569 | B1 * | 4/2002 | Acres | 463/27 |
| 6,435,506 | B1 | 8/2002 | Piccoli | |
| 6,439,995 | B1 | 8/2002 | Hughs-Baird et al. | |
| 6,511,375 | B1 | 1/2003 | Kaminkow | |
| 6,585,591 | B1 | 7/2003 | Baerlocher et al. | |
| 6,656,048 | B2 * | 12/2003 | Olsen | 463/25 |
| 6,887,154 | B1 * | 5/2005 | Luciano et al. | 463/26 |
| 2001/0018361 | A1 * | 8/2001 | Acres | 463/27 |
| 2001/0036857 | A1 * | 11/2001 | Mothwurf et al. | 463/25 |
| 2002/0039923 | A1 * | 4/2002 | Cannon et al. | 463/42 |
| 2002/0042296 | A1 | 4/2002 | Walker et al. | 463/23 |
| 2002/0160826 | A1 | 10/2002 | Gomez et al. | 463/16 |
| 2002/0165023 | A1 | 11/2002 | Brosnan et al. | 463/29 |
| 2002/0177483 | A1 * | 11/2002 | Cannon | 463/42 |
| 2002/0187836 | A1 * | 12/2002 | Meyer | 463/42 |
| 2003/0100361 | A1 * | 5/2003 | Sharpless et al. | 463/25 |

FOREIGN PATENT DOCUMENTS

| | | |
|---|---|---|
| WO | 01/19475 | 3/2001 |

OTHER PUBLICATIONS

PCT Search Report issued for PCT/US2004/007433 on Jul. 30, 2004.
Legato, F., “All Aboard!,” Cash Express Hyperlink.

* cited by examiner

FIG. 10
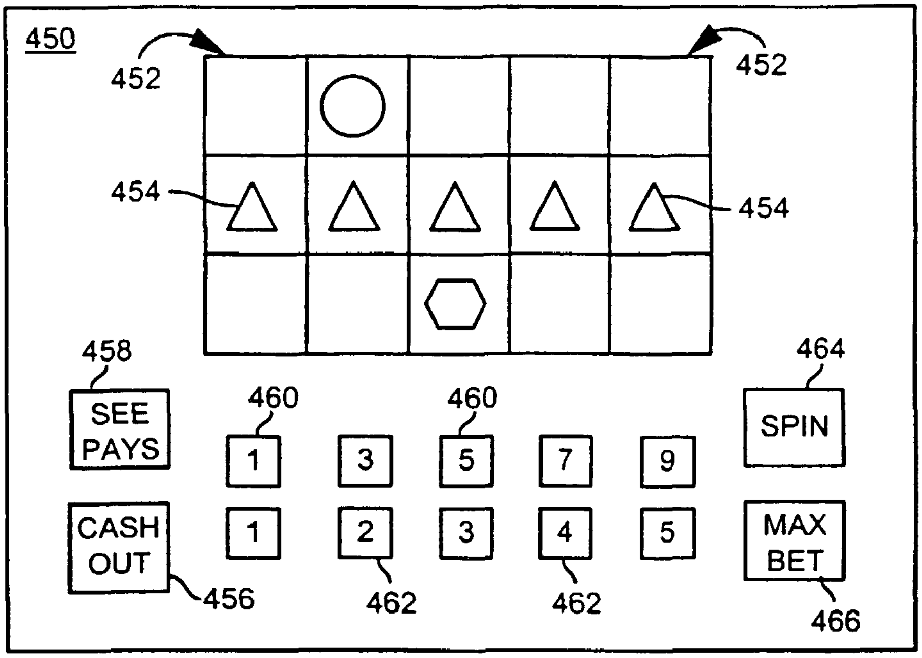
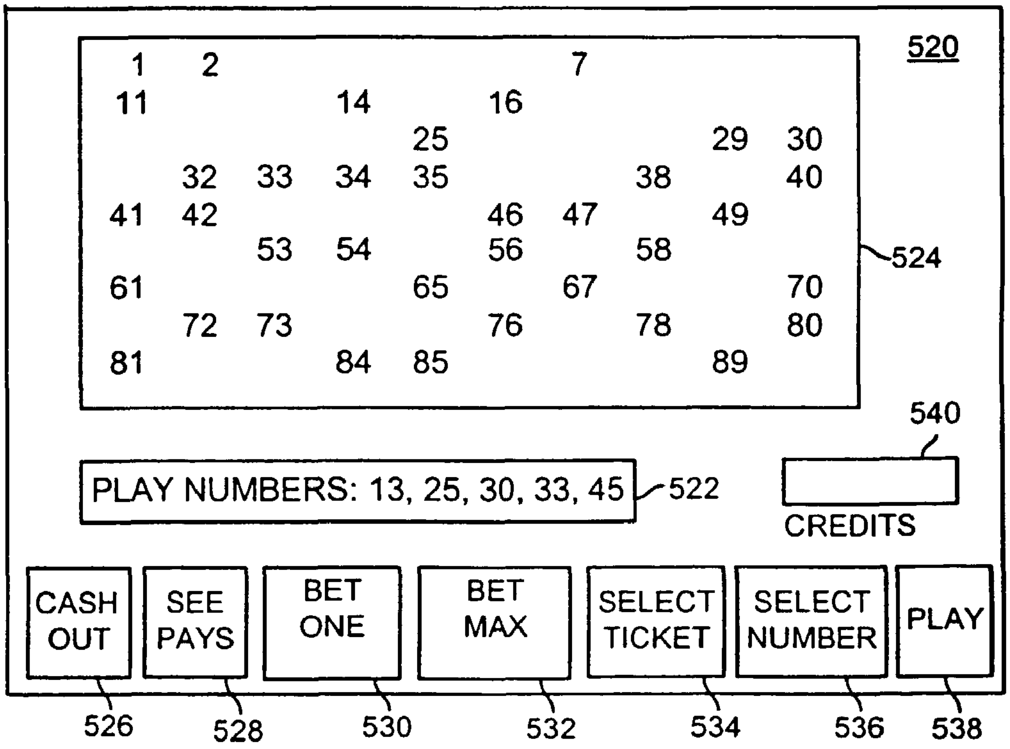
FIG. 11

GAMING UNITS WITH AN ENHANCED GROUP BONUS ROUND

BACKGROUND

The present disclosure relates to gaming units and, more particularly, to a plurality of gaming units with an enhanced bonus round.

Conventional gaming units are typically provided with a cabinet and a gaming display mounted inside the cabinet. The gaming display may be mechanical, such as a series of stepper wheels, may be electronic such as a video display that is capable of generating video images, or may be a combination of the two, such as a stepper wheel with an electronic video display attached thereto. Whether mechanical, electronic, or combination, the gaming display of conventional gaming units has generated images associated with a gaming system, such as poker, blackjack, slots, keno, or bingo.

While the gaming display is the primary functional component, many gaming units include one or more design or stylistic elements to attract a player's attention to the gaming unit. Such stylistic elements include the use of certain color schemes or themes, and back-lit, semi-opaque panels having artwork or gaming information printed thereon. In addition to design or stylistic elements, many gaming units incorporate stylistic or function lighting elements to attract a player's attention. For example, a gaming unit may include flashing lights to attract a player.

In addition to attracting a player's attention, many gaming units incorporate additional stylistic or functional elements to keep the player's attention as long as possible by increasing the play value of the gaming unit. For example, a typical gaming unit may have a special or bonus mode that is triggered as a result of a certain outcome of the gaming session. During the bonus mode, the gaming unit runs a different gaming session or provides increased value payouts, thereby enhancing the play value.

In order to adequately alert the player when a special or bonus mode is triggered, the typical gaming unit has been provided with a visual element, such as an illuminated bezel, which comprises a transparent material that allows a plurality of lights to be viewed therethrough when the lights are illuminated, or other device. While the typical gaming unit has utilized the visual element to alert the player to a bonus mode, the visual cues have heretofore been a passive attraction element for the gaming unit, and not an active bonus mode participant. In other words, the visual elements have added a visual attraction enhancement to the bonus mode, wherein the bonus mode has taken place on another portion of the gaming unit, e.g., the gaming unit video display.

SUMMARY OF THE INVENTION

The invention relates to the use of a light device for conducting a group bonus round game on gaming system comprising a plurality of gaming units. Gaming units that are arranged in a network, i.e., a "group" or "bank" of units, may be operatively connected via the network and may be adapted to participate in a group bonus round. The group bonus round may cause a bonus indicia to be generated on a subset of the light devices, and create the illusion that the bonus indicia is spinning, or revolving through the gaming system before stopping at a specific gaming unit which may be declared the group bonus round winner. The group bonus round may additionally utilize music and/or bonus stages to create other bonus round gaming themes, for example a "musical chairs" type group bonus round.

In accordance with one aspect of the invention, a gaming system for generating a gaming system bonus game may include a gaming system controller and a plurality of gaming units. Each of the gaming units may include a display unit that is capable of generating video images, a light device, a value input device, and a gaming apparatus controller programmed to allow a person to make a wager on the outcome of a game. The gaming system may initiate a group bonus game, wherein the group bonus game may display a bonus indicia on a first subset of the gaming apparatuses, and, as the bonus game play continues, may display the same, or different bonus indicia a second subset of gaming apparatuses. The group bonus round may conclude when the bonus indicia stops on a specific subset of gaming units, and a value payout determined.

In accordance with another aspect of the invention, a gaming unit may be adapted to communicate with a plurality of other gaming units to form a gaming network. The gaming unit may include a display unit that is capable of generating video images, and capable of playing a traditional wagering game. The gaming unit may also include a light device, wherein the light device may be adapted to allow the gaming unit to participate in a group bonus game. The group bonus game may be conducted by displaying a bonus indicia on a first subset of the connected gaming units, and as the bonus game play continues, by displaying the same or different bonus indicia on a second subset of the connected gaming units. The group bonus round may conclude when the bonus indicia stops on a specific subset of the connected gaming units, and a value payout determined.

In accordance with yet another aspect of the invention, a bonus round gaming method may include the use of a plurality of gaming units, each capable of conducting a traditional wagering game. The bonus round may be played by causing a group bonus game to be initiated on a plurality of gaming units, each of the gaming units having a light device upon which a bonus indicia may be displayed. The eligibility of each of the gaming units to participate in the group bonus game may be determined before the commencement of the bonus game. Upon commencement of the bonus game, the bonus indicia may be generated on the light devices of a first subset of gaming units, and subsequently, the bonus indicia may be generated on the light devices of a second subset of gaming units. The bonus game may continue, until finally, a value payout associated with the outcome of the bonus game may be determined.

Additional aspects of the invention are defined by the claims of this patent.

BRIEF DESCRIPTION OF THE DRAWINGS

FIG. 10 is an illustration of an embodiment of a visual display that may be displayed during performance of the slots routine of FIG. 12;

FIG. 11 is an illustration of an embodiment of a visual display that may be displayed during performance of the video keno routine of FIG. 13;

DETAILED DESCRIPTION OF VARIOUS EMBODIMENTS

Although the following text sets forth a detailed description of numerous different embodiments of the invention, it should be understood that the legal scope of the invention is defined by the words of the claims set forth at the end of this patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should also be understood that, unless a term is expressly defined in this patent using the sentence "As used herein, the term '______' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
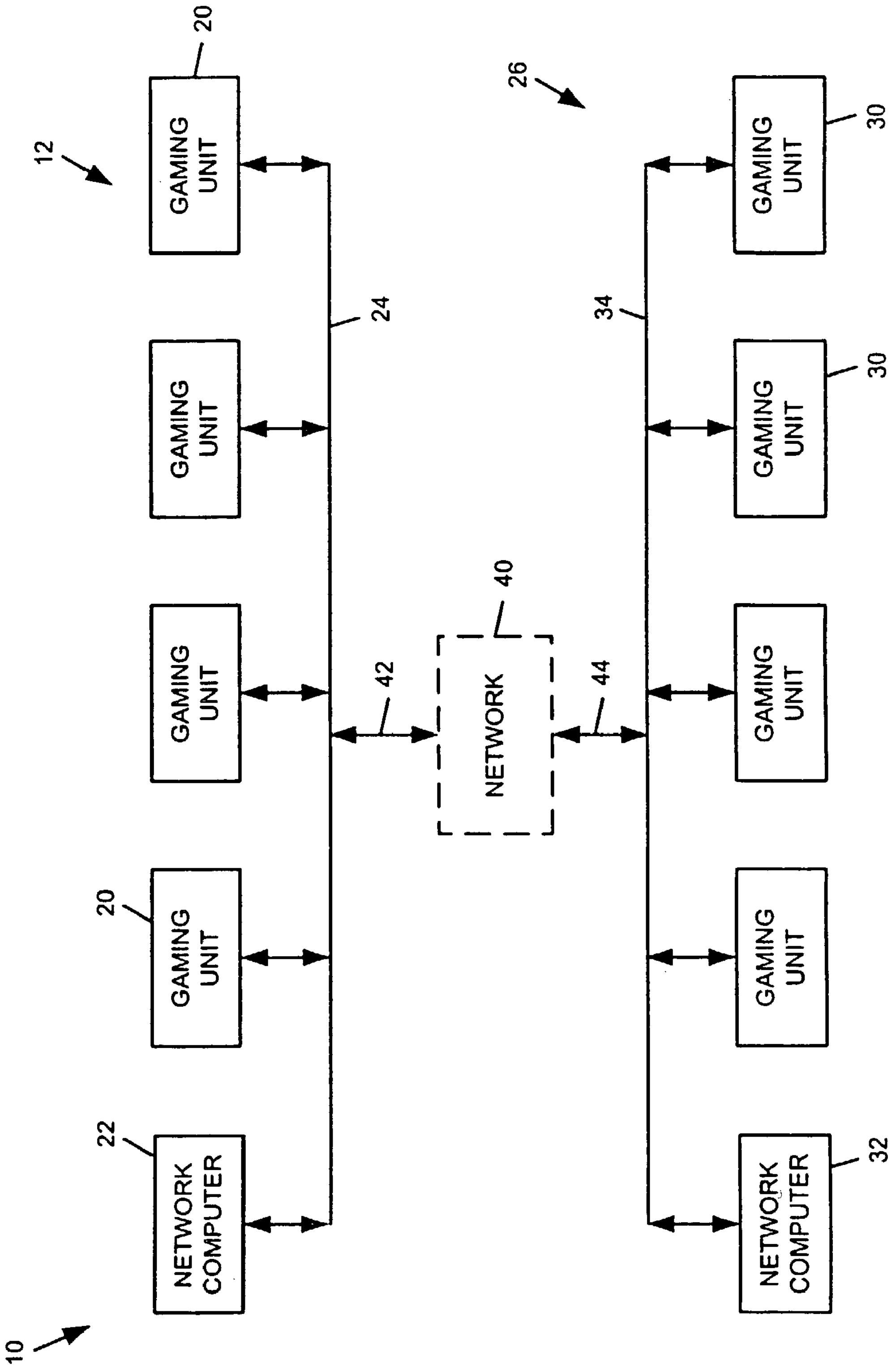
FIG. 1 is a block diagram of an embodiment of a gaming system in accordance with the invention.

FIG. 1 illustrates one possible embodiment of a casino gaming system 10 in accordance with the invention. Referring to FIG. 1, the casino gaming system 10 may include a first group or network 12 of casino gaming units 20 operatively coupled to a network computer 22 via a network data link or bus 24. The casino gaming system 10 may include a second group or network 26 of casino gaming units 30 operatively coupled to a network computer 32 via a network data link or bus 34. The first and second gaming networks 12, 26 may be operatively coupled to each other via a network 40, which may comprise, for example, the Internet, a wide area network (WAN), or a local area network (LAN) via a first network link 42 and a second network link 44.

The first network 12 of gaming units 20 may be provided in a first casino, and the second network 26 of gaming units 30 may be provided in a second casino located in a separate geographic location than the first casino. For example, the two casinos may be located in different areas of the same city, or they may be located in different states. The network 40 may include a plurality of network computers or server computers (not shown), each of which may be operatively interconnected. Where the network 40 comprises the Internet, data communication may take place over the communication links 42, 44 via an Internet communication protocol.

The network computer 22 may be a server computer and may be used to accumulate and analyze data relating to the operation of the gaming units 20. For example, the network computer 22 may continuously receive data from each of the gaming units 20 indicative of the dollar amount and number of wagers being made on each of the gaming units 20, data indicative of how much each of the gaming units 20 is paying out in winnings, data regarding the identity and gaming habits of players playing each of the gaming units 20, etc. The network computer 32 may be a server computer and may be used to perform the same or different functions in relation to the gaming units 30 as the network computer 22 described above.

Although each network 12, 26 is shown to include one network computer 22, 32 and four gaming units 20, 30, it should be understood that different numbers of computers and gaming units may be utilized. For example, the network 12 may include a plurality of network computers 22 and tens or hundreds of gaming units 20, all of which may be interconnected via the data link 24. The data link 24 may provided as a dedicated hardwired link or a wireless link. Although the data link 24 is shown as a single data link 24, the data link 24 may comprise multiple data links.

Figure 1A:
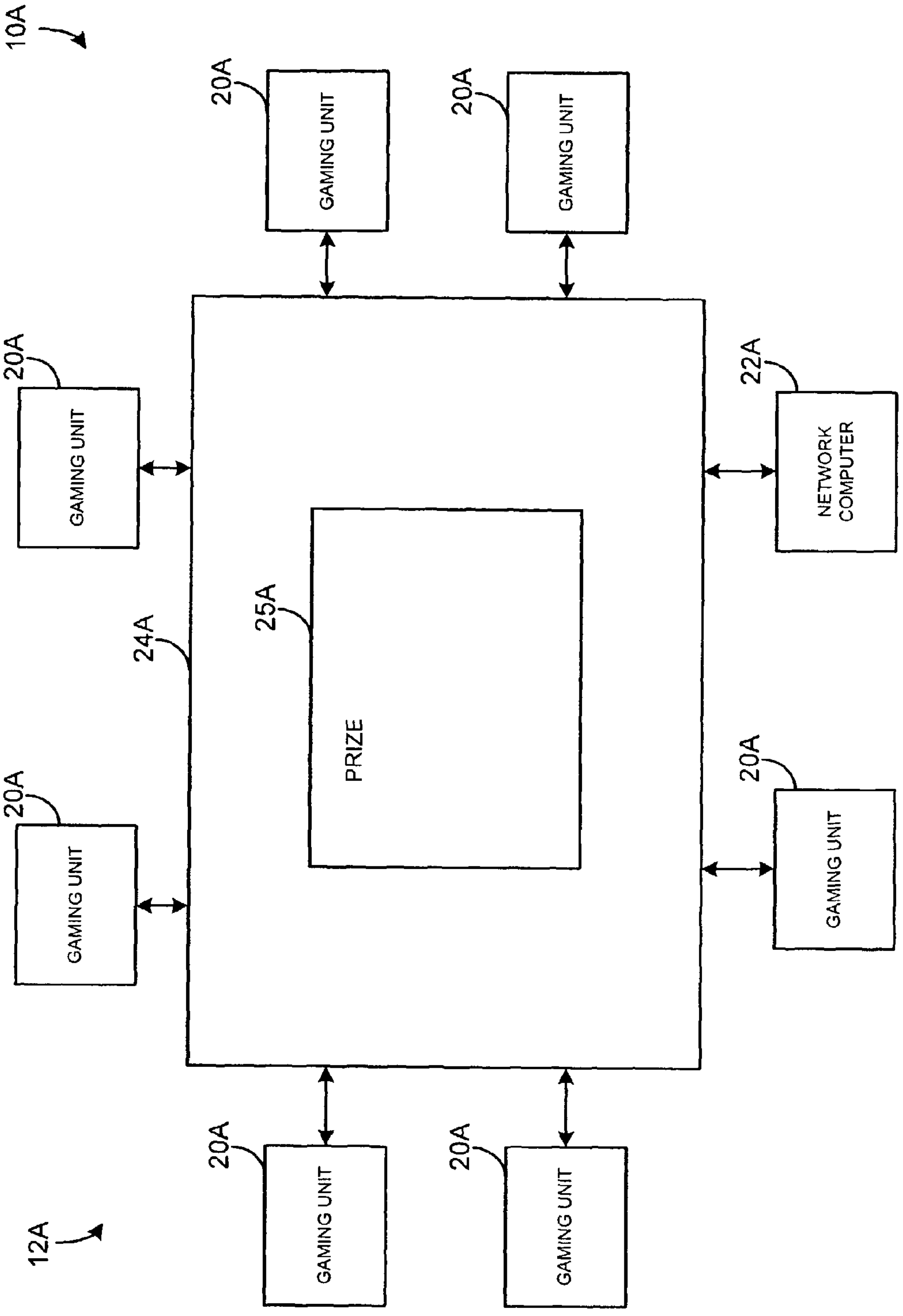
FIG. 1A is a block diagram of another embodiment of a gaming system in accordance with the invention.

FIG. 1A illustrates another possible embodiment of a casino gaming system 10A in accordance with the invention. Referring to FIG. 1A, the casino gaming system 10A may include a group or network 12A of gaming units 20A operatively coupled to a network computer 22A via a network data link or bus 24A. The network data link 24A may comprise, for example, the Internet, a wide area network (WAN), or a local area network (LAN). The gaming system 10A may include a prize display 25A (e.g., a platform holding a prize or a display illustrating a prize). The prize may be, for example, a bonus round prize, such as a progressive jackpot, cash or other value, an automobile, or the like. The gaming system 10A may be provided in a single casino location, or alternatively, may be provided in a plurality of casino locations, including separate geographic locations as described above and may further be arranged in any physical arrangement. It should be understood that the casino gaming system 10A may have the same design as the casino gaming system 10, gaming units 20A may have the same design as the gaming units 20, the network computer 22A may have the same design as the network computer 22, and the network data link or bus 24A may have the same design as the network data link or bus 24 as described herein.

Figure 2:
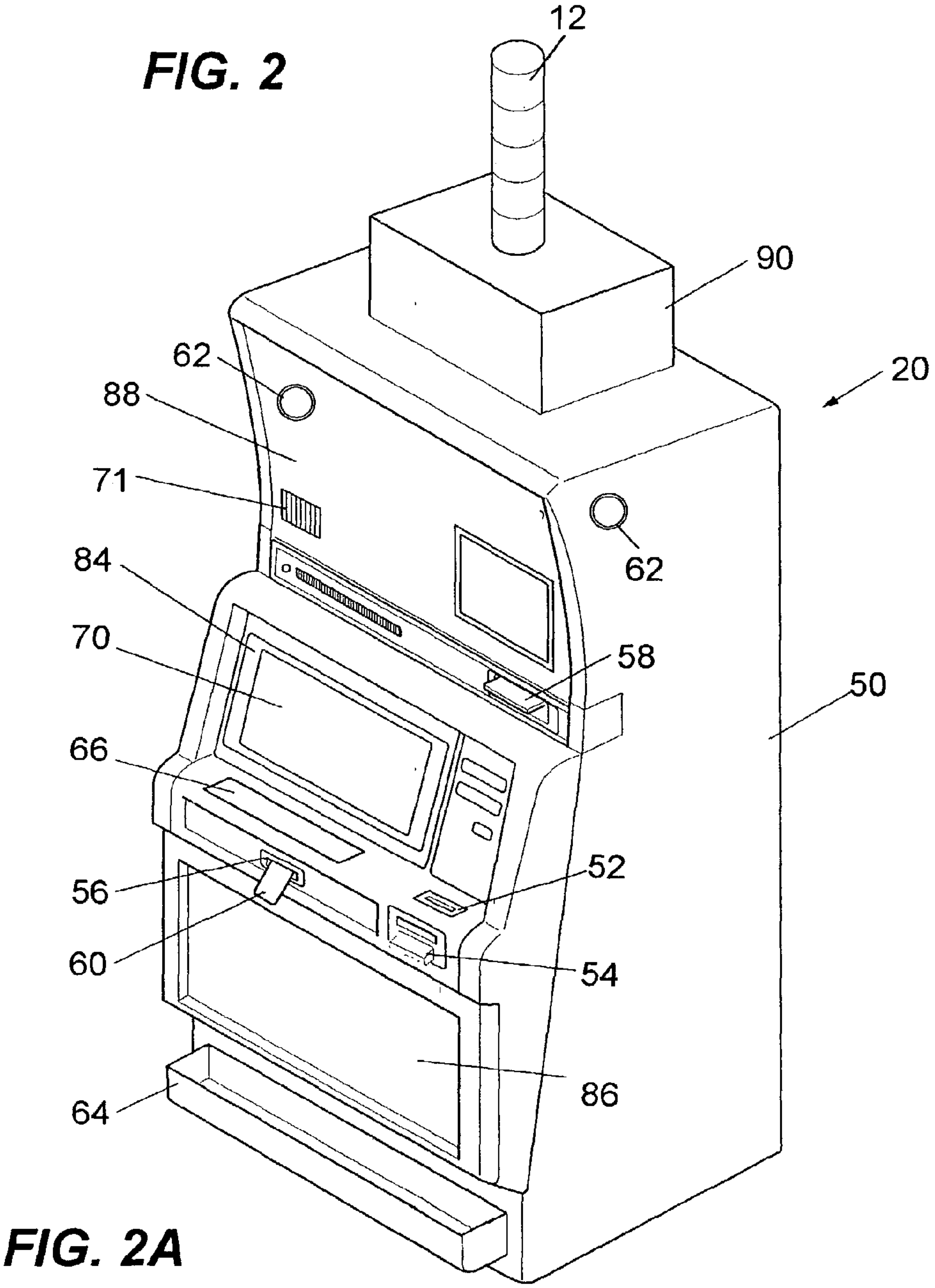
FIG. 2 is a perspective view of an embodiment of one of the gaming units shown schematically in FIG. 1.

FIG. 2 is a perspective view of one possible embodiment of one or more of the gaming units 20. Although the following description addresses the design of the gaming units 20, it should be understood that the gaming units 30 may have the same design as the gaming units 20 described below. It should be understood that the design of one or more of the gaming units 20 may be different than the design of other gaming units 20, and that the design of one or more of the gaming units 30 may be different than the design of other gaming units 30. Each gaming unit 20 may be any type of casino gaming unit and may have various different structures and methods of operation. For exemplary purposes, various designs of the gaming units 20 are described below, but it should be understood that numerous other designs may be utilized.

Referring to FIG. 2, the casino gaming unit 20 may include a housing or cabinet 50 and one or more input devices, which may include a coin slot or acceptor 52, a paper currency acceptor 54, a ticket reader/printer 56 and a card reader 58, which may be used to input value to the gaming unit 20. A value input device may include any device that can accept value from a customer. As used herein, the term "value" may encompass gaming tokens, coins, paper currency, ticket vouchers, credit or debit cards, smart cards, and any other object representative of value.

If provided on the gaming unit 20, the ticket reader/printer 56 may be used to read and/or print or otherwise encode ticket vouchers 60. The ticket vouchers 60 may be composed of paper or another printable or encodable material and may have one or more of the following informational items printed or encoded thereon: the casino name, the type of ticket voucher, a validation number, a bar code with control and/or security data, the date and time of issuance of the ticket voucher, redemption instructions and restrictions, a description of an award, and any other information that may be necessary or desirable. Different types of ticket vouchers 60 could be used, such as bonus ticket vouchers, cash-redemption ticket vouchers, casino chip ticket vouchers, extra game play ticket vouchers, merchandise ticket vouchers, restaurant ticket vouchers, show ticket vouchers, etc. The ticket vouchers 60 could be printed with an optically readable material such as ink, or data on the ticket vouchers 60 could be magnetically encoded. The ticket reader/printer 56 may be provided with the ability to both read and print ticket vouchers 60, or it may be provided with the ability to only read or only print or encode ticket vouchers 60. In the latter case, for example, some of the gaming units 20 may have ticket printers 56 that may be used to print ticket vouchers 60, which could then be used by a player in other gaming units 20 that have ticket readers 56.

If provided, the card reader 58 may include any type of card reading device, such as a magnetic card reader or an optical card reader, and may be used to read data from a card offered by a player, such as a credit card or a player tracking card. If provided for player tracking purposes, the card reader 58 may be used to read data from, and/or write data to, player tracking cards that are capable of storing data representing the identity of a player, the identity of a casino, the player's gaming habits, etc.

The gaming unit 20 may include one or more audio speakers 62, a coin payout tray 64, an input control panel 66, a color video display unit 70 for displaying images relating to the game or games provided by the gaming unit 20, a status display 71 for providing player information, such as number of credits remaining, and a light device, such as, for example, an illuminated light bezel 84, a lighted bolster 86, a lighted topbox 88, a topper 90, and a lighted gaming candle 92, as are well known in the art. The audio speakers 62 may generate audio representing sounds such as the noise of spinning slot machine reels, a dealer's voice, music, announcements or any other audio related to a casino game. The input control panel 66 may be provided with a plurality of pushbuttons or touch-sensitive areas that may be pressed by a player to select games, make wagers, make gaming decisions, etc. The status display 71 may provide gaming information to the player, such as the number of credits remaining, the outcome of the current game, the payout schedule, or the like. The light bezel 84 may be coupled to the front face of the cabinet 50 and may enclose a plurality of lights 94 (FIG. 2B), and further may have an aperture, allowing the color video display unit 70 to be visible therethrough. The lighted bolster 86, the lighted topbox 88, the topper 90, and the lighted gaming candle 92 may be stylistic elements added to the gaming unit 20 to attract a players attention, or to provide visual cues to gaming status.

Figure 2A:
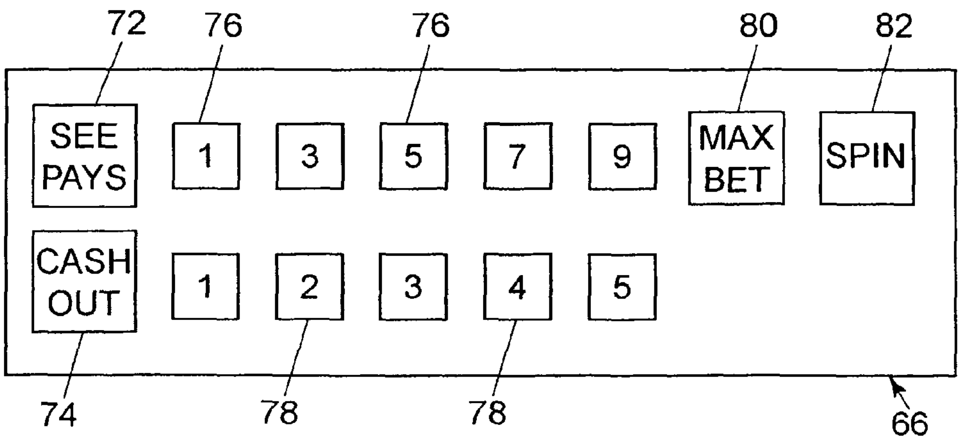
FIG. 2A illustrates an embodiment of a control panel for a gaming unit.

FIG. 2A illustrates one possible embodiment of the control panel 66, which may be used where the gaming unit 20 is a slot machine having a plurality of mechanical or "virtual" reels. Referring to FIG. 2A, the control panel 66 may include a "See Pays" button 72 that, when activated, causes the display unit 70 to generate one or more display screens showing the odds or payout information for the game or games provided by the gaming unit 20. As used herein, the term "button" is intended to encompass any device that allows a player to make an input, such as an input device that must be depressed to make an input selection or a display area that a player may simply touch. The control panel 66 may include a "Cash Out" button 74 that may be activated when a player decides to terminate play on the gaming unit 20, in which case the gaming unit 20 may return value to the player, such as by returning a number of coins to the player via the payout tray 64.

If the gaming unit 20 provides a slots game having a plurality of reels and a plurality of paylines which define winning combinations of reel symbols, the control panel 66 may be provided with a plurality of selection buttons 76, each of which allows the player to select a different number of paylines prior to spinning the reels. For example, five buttons 76 may be provided, each of which may allow a player to select one, three, five, seven or nine paylines.

If the gaming unit 20 provides a slots game having a plurality of reels, the control panel 66 may be provided with a plurality of selection buttons 78 each of which allows a player to specify a wager amount for each payline selected. For example, if the smallest wager accepted by the gaming unit 20 is a quarter ($0.25), the gaming unit 20 may be provided with five selection buttons 78, each of which may allow a player to select one, two, three, four or five quarters to wager for each payline selected. In that case, if a player were to activate the "5" button 76 (meaning that five paylines were to be played on the next spin of the reels) and then activate the "3" button 78

(meaning that three coins per payline were to be wagered), the total wager would be $3.75 (assuming the minimum bet was $0.25).

The control panel 66 may include a "Max Bet" button 80 to allow a player to make the maximum wager allowable for a game. In the above example, where up to nine paylines were provided and up to five quarters could be wagered for each payline selected, the maximum wager would be 45 quarters, or $11.25. The control panel 66 may include a spin button 82 to allow the player to initiate spinning of the reels of a slots game after a wager has been made.

In FIG. 2A, a rectangle is shown around the buttons 72, 74, 76, 78, 80, 82. It should be understood that that rectangle simply designates, for ease of reference, an area in which the buttons 72, 74, 76, 78, 80, 82 may be located. Consequently, the term "control panel" should not be construed to imply that a panel or plate separate from the housing 50 of the gaming unit 20 is required, and the term "control panel" may encompass a plurality or grouping of player activatable buttons.

Although one possible control panel 66 is described above, it should be understood that different buttons could be utilized in the control panel 66, and that the particular buttons used may depend on the game or games that could be played on the gaming unit 20. Although the control panel 66 is shown to be separate from the display unit 70, it should be understood that the control panel 66 could be generated by the display unit 70. In that case, each of the buttons of the control panel 66 could be a colored area generated by the display unit 70, and some type of mechanism may be associated with the display unit 70 to detect when each of the buttons was touched, such as a touch-sensitive screen.

Figure 2B:
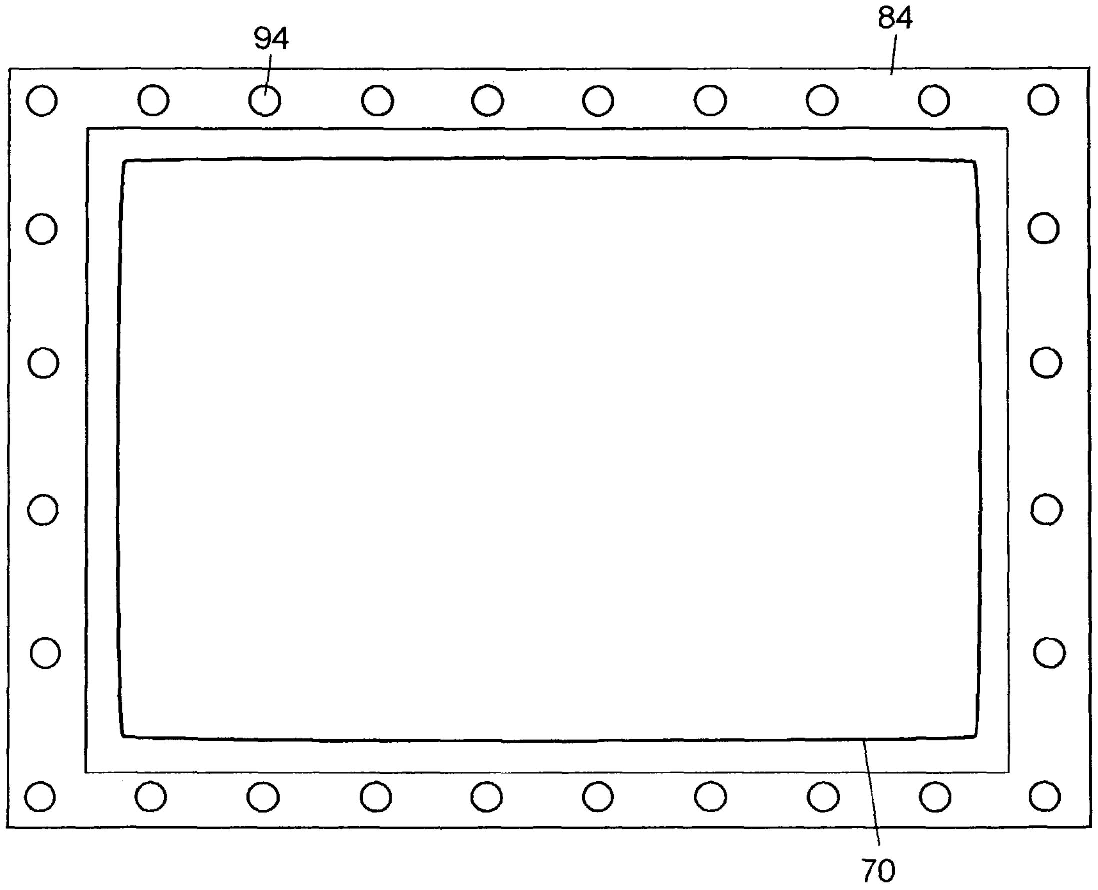
FIG. 2B illustrates an embodiment of a light device for a gaming unit.

FIG. 2B illustrates one possible embodiment of the light bezel 84, which may be used, for example, where the gaming unit 20 is a slot machine having a plurality of mechanical or "virtual" reels. The light bezel 84 may be operatively coupled to the front face of the cabinet 50 of the gaming unit 20, as shown in FIG. 2. The light bezel 84 may extend around the color video display unit 70 to provide an attractive "frame" for the display unit 70. The light bezel 84 may be formed of a transparent plastic material which allows a player to view a plurality of lights 94, for example, a plurality of light emitting diodes (LEDs), positioned within or behind the light bezel 84. In one embodiment, the light bezel 84 may be constructed of molded plastic having an aperture sized to provide an unobstructed view of the display unit 70 when the light bezel 84 is attached to the front face of the cabinet 50. It will be understood that the light bezel 84 may be any physical shape, and may have any number lights 94, each light may be operatively independent and may have a plurality of light display attributes, including, for example, any number of supported colors, and any number of contrast and/or brightness settings. Furthermore, the light bezel 84 may comprise any known or yet to be developed type of light 94, including, by way of example, a cathode ray tube, an organic light emitting device, a plasma display, a liquid crystal display, or the like.

Gaming Unit Electronics

Figure 3:
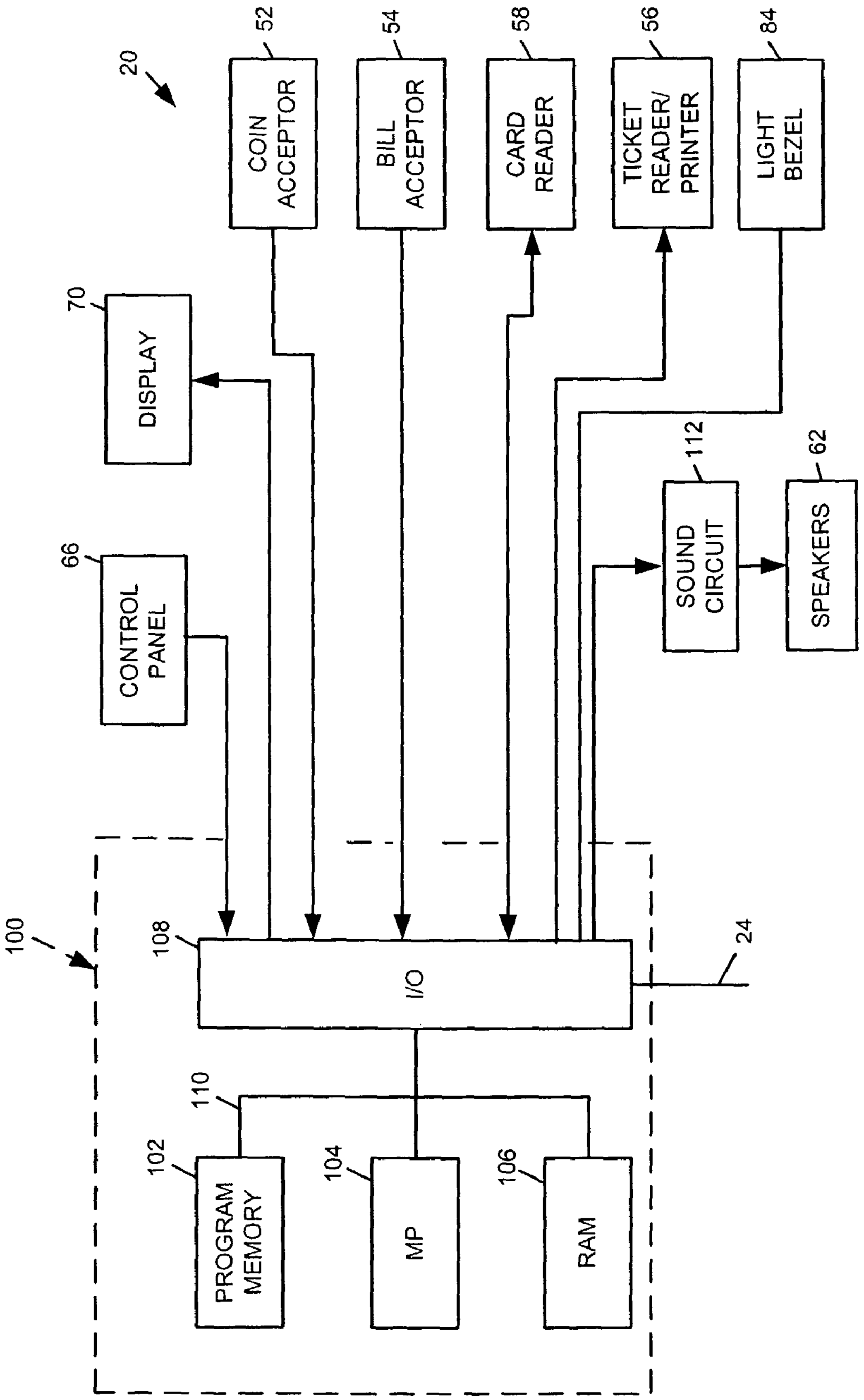
FIG. 3 is a block diagram of the electronic components of the gaming unit of FIG. 2.

FIG. 3 is a block diagram of a number of components that may be incorporated in the gaming unit 20 or alternatively, the network computer 22. Referring to FIG. 3, the gaming unit 20 may include a controller 100 that may comprise a program memory 102, a microcontroller or microprocessor (MP) 104, a random-access memory (RAM) 106 and an input/output (I/O) circuit 108, all of which may be interconnected via an address/data bus 110. It should be appreciated that although only one microprocessor 104 is shown, the controller 100 may include multiple microprocessors 104. Similarly, the memory of the controller 100 may include multiple RAMs 106 and multiple program memories 102. Although the I/O circuit 108 is shown as a single block, it should be appreciated that the I/O circuit 108 may include a number of different types of I/O circuits. The RAM(S) 104 and program memories 102 may be implemented as semiconductor memories, magnetically readable memories, and/or optically readable memories, for example.

Although the program memory 102 is shown in FIG. 3 as a read-only memory (ROM) 102, the program memory of the controller 100 may be a read/write or alterable memory, such as a hard disk. In the event a hard disk is used as a program memory, the address/data bus 110 shown schematically in FIG. 3 may comprise multiple address/data buses, which may be of different types, and there may be an I/O circuit disposed between the address/data buses.

FIG. 3 illustrates that the control panel 66, the coin acceptor 52, the bill acceptor 54, the card reader 58 and the ticket reader/printer 56 may be operatively coupled to the I/O circuit 108, each of those components being so coupled by either a unidirectional or bidirectional, single-line or multiple-line data link, which may depend on the design of the component that is used. The speaker(s) 62 may be operatively coupled to a sound circuit 112, that may comprise a voice- and sound-synthesis circuit or that may comprise a driver circuit. The sound-generating circuit 112 may be coupled to the I/O circuit 108.

As shown in FIG. 3, the components 52, 54, 56, 58, 66, 70, 84, 112 may be connected to the I/O circuit 108 via a respective direct line or conductor. Different connection schemes could be used. For example, one or more of the components shown in FIG. 3 may be connected to the I/O circuit 108 via a common bus or other data link that is shared by a number of components. Furthermore, some of the components may be directly connected to the microprocessor 104 without passing through the I/O circuit 108. Moreover, while not illustrated in the figures, the components 71, 86, 88, 90 and 92 may also be operatively coupled to the controller 100. For example, the components 71, 86, 88, 90 and 92 may be connected to the I/O circuit 108 via a respective direct line or other similar connection scheme. Overall Operation of Gaming Unit One manner in which one or more of the gaming units 20 (and one or more of the gaming units 30) may operate is described below in connection with a number of flowcharts which represent a number of portions or routines of one or more computer programs, which may be stored in one or more of the memories of the controller 100. The computer program(s) or portions thereof may be stored remotely, outside of the gaming unit 20, and may control the operation of the gaming unit 20 from a remote location. Such remote control may be facilitated with the use of a wireless connection, or by an Internet interface that connects the gaming unit 20 with a remote computer (such as one of the network computers 22, 32) having a memory in which the computer program portions are stored. The computer program portions may be written in any high level language such as C, C++, C#, Java or the like or any low-level assembly or machine language. By storing the computer program portions therein, various portions of the memories 102, 106 are physically and/or structurally configured in accordance with computer program instructions.

Figure 4:
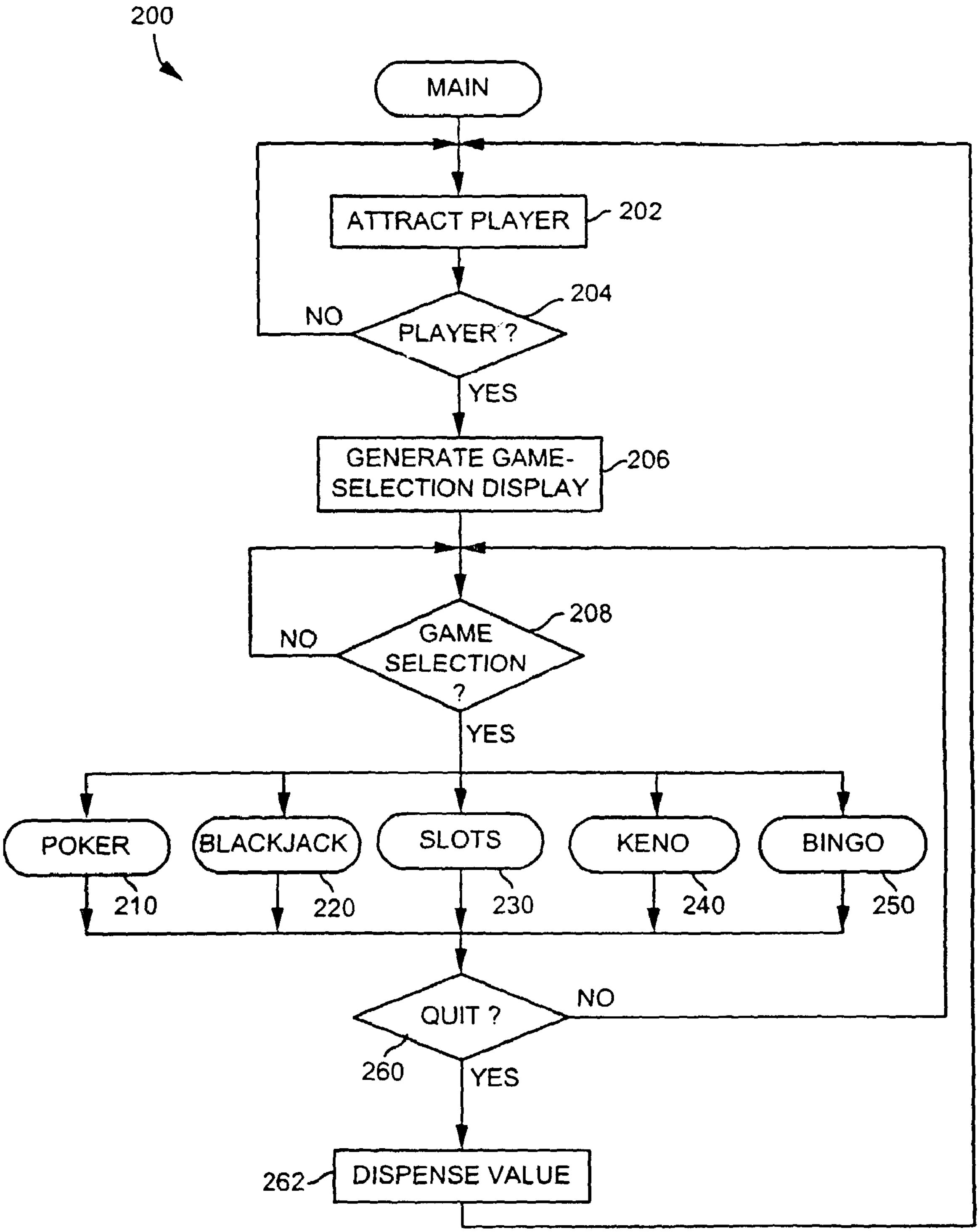
FIG. 4 is a flowchart of an embodiment of a main routine that may be performed during operation of one or more of the gaming units.

FIG. 4 is a flowchart of a main operating routine 200 that may be stored in the memory of the controller 100. Referring to FIG. 4, the main routine 200 may begin operation at block 202 during which an attraction sequence may be performed in an attempt to induce a potential player in a casino to play the gaming unit 20. The attraction sequence may be performed by displaying one or more video images on the display unit 70 and/or causing one or more sound segments, such as voice or music, to be generated via the speakers 62. The attraction sequence may include a scrolling list of games that may be played on the gaming unit 20 and/or video images of various games being played, such as video poker, video blackjack, video slots, video keno, video bingo, etc.

During performance of the attraction sequence, if a potential player makes any input to the gaming unit 20 as determined at block 204, the attraction sequence may be terminated and a game-selection display may be generated on the display unit 70 at block 206 to allow the player to select a game available on the gaming unit 20. The gaming unit 20 may detect an input at block 204 in various ways. For example, the gaming unit 20 could detect if the player presses any button on the gaming unit 20; the gaming unit 20 could determine if the player deposited one or more coins into the gaming unit 20; the gaming unit 20 could determine if player deposited paper currency into the gaming unit; etc.

The game-selection display generated at block 206 may include, for example, a list of video games that may be played on the gaming unit 20 and/or a visual message to prompt the player to deposit value into the gaming unit 20. While the game-selection display is generated, the gaming unit 20 may wait for the player to make a game selection. Upon selection of one of the games by the player as determined at block 208, the controller 100 may cause one of a number of game routines to be performed to allow the selected game to be played. For example, the game routines could include a video poker routine 210, a video blackjack routine 220, a slots routine 230, a video keno routine 240, and a video bingo routine 250. At block 208, if no game selection is made within a given period of time, the operation may branch back to block 202.

After one of the routines 210, 220, 230, 240, 250 has been performed to allow the player to play one of the games, block 260 may be utilized to determine whether the player wishes to terminate play on the gaming unit 20 or to select another game. If the player wishes to stop playing the gaming unit 20, which wish may be expressed, for example, by selecting a “Cash Out” button, the controller 100 may dispense value to the player at block 262 based on the outcome of the game(s) played by the player. The operation may then return to block 202. If the player did not wish to quit as determined at block 260, the routine may return to block 208 where the game-selection display may again be generated to allow the player to select another game.

It should be noted that although five gaming routines are shown in FIG. 4, a different number of routines could be included to allow play of a different number of games. The gaming unit 20 may also be programmed to allow play of different games.

Figure 5:
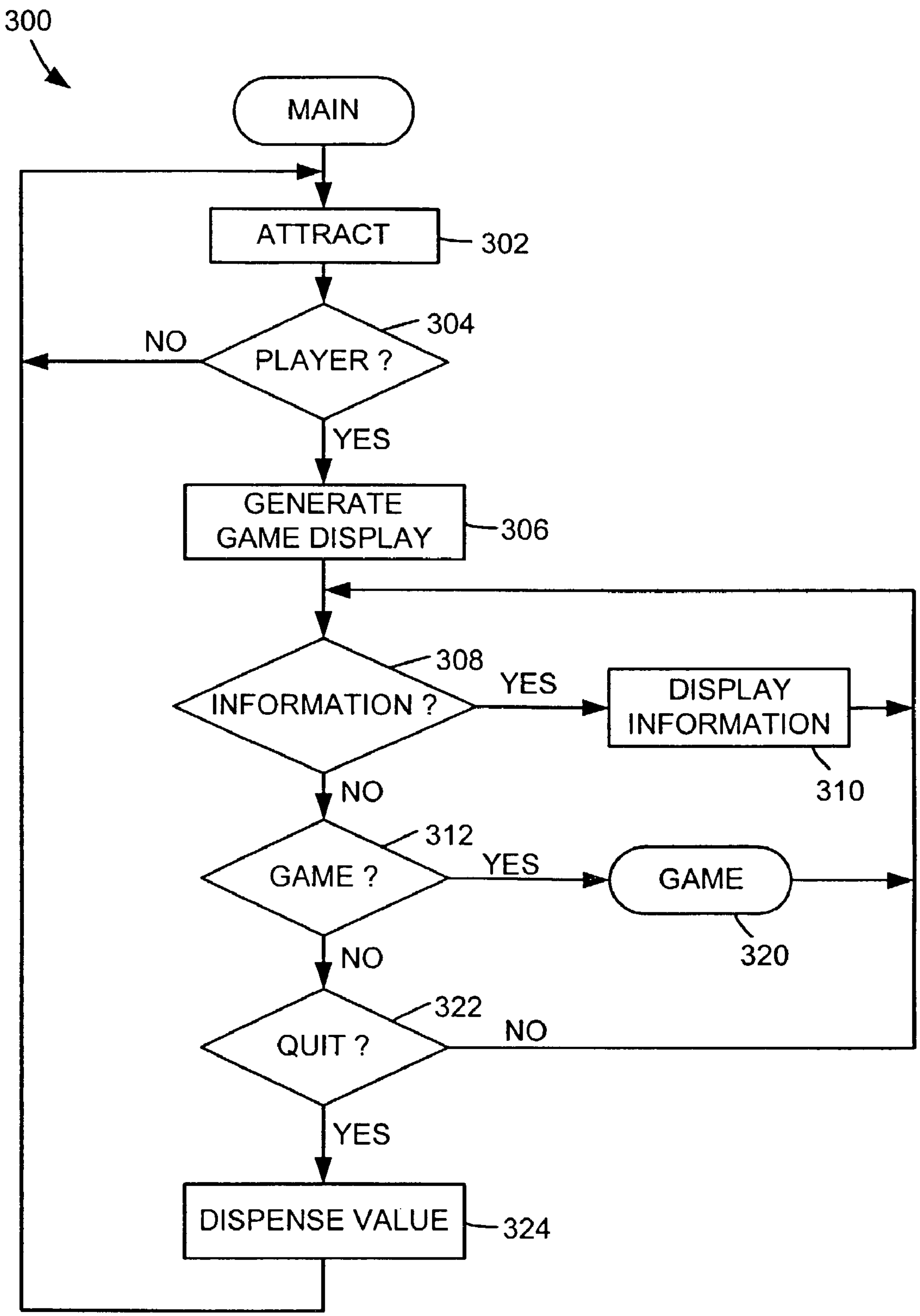
FIG. 5 is a flowchart of an alternative embodiment of a main routine that may be performed during operation of one or more of the gaming units.

FIG. 5 is a flowchart of an alternative main operating routine 300 that may be stored in the memory of the controller 100. The main routine 300 may be utilized for gaming units 20 that are designed to allow play of only a single game or single type of game. Referring to FIG. 5, the main routine 300 may begin operation at block 302 during which an attraction sequence may be performed in an attempt to induce a potential player in a casino to play the gaming unit 20. The attraction sequence may be performed by displaying one or more video images on the display unit 70 and/or causing one or more sound segments, such as voice or music, to be generated via the speakers 62.

During performance of the attraction sequence, if a potential player makes any input to the gaming unit 20 as determined at block 304, the attraction sequence may be terminated and a game display may be generated on the display unit 70 at block 306. The game display generated at block 306 may include, for example, an image of the casino game that may be played on the gaming unit 20 and/or a visual message to prompt the player to deposit value into the gaming unit 20. At block 308, the gaming unit 20 may determine if the player requested information concerning the game, in which case the requested information may be displayed at block 310. Block 312 may be used to determine if the player requested initiation of a game, in which case a game routine 320 may be performed. The game routine 320 could be any one of the game routines disclosed herein, such as one of the five game routines 210, 220, 230, 240, 250, or another game routine.

After the routine 320 has been performed to allow the player to play the game, block 322 may be utilized to determine whether the player wishes to terminate play on the gaming unit 20. If the player wishes to stop playing the gaming unit 20, which wish may be expressed, for example, by selecting a “Cash Out” button, the controller 100 may dispense value to the player at block 324 based on the outcome of the game(s) played by the player. The operation may then return to block 302. If the player did not wish to quit as determined at block 322, the operation may return to block 308.

Video Poker

Figure 6:
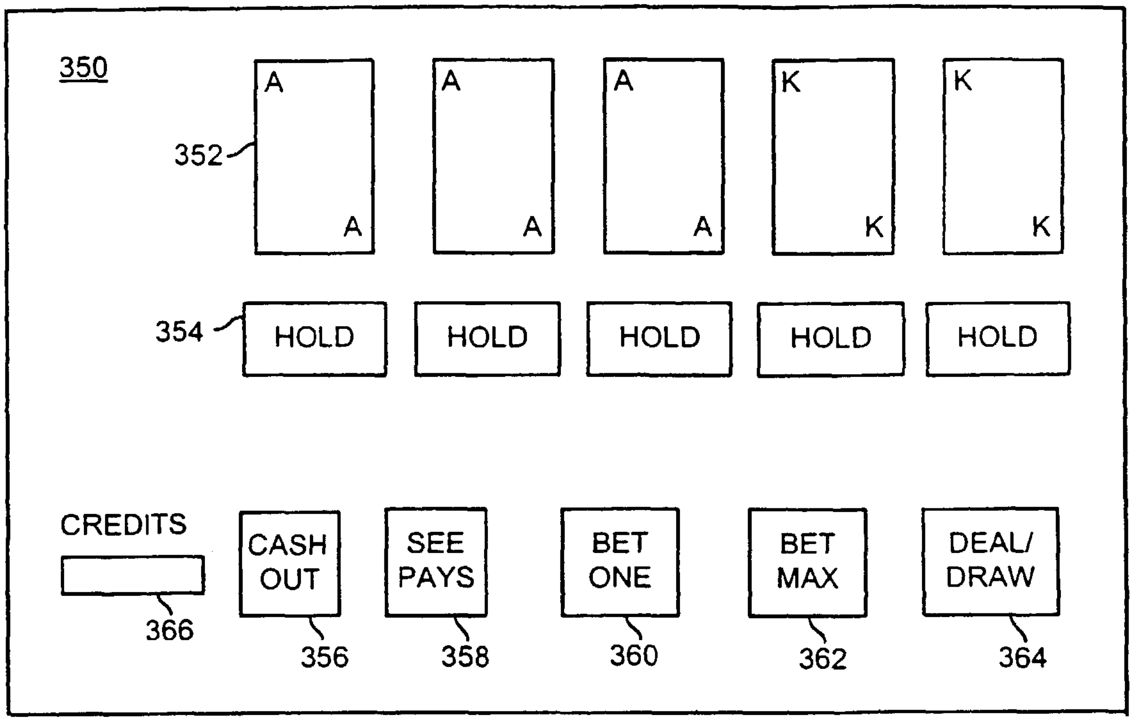
FIG. 6 is an illustration of an embodiment of a visual display that may be displayed during performance of the video poker routine of FIG. 8.

FIG. 6 is an exemplary display 350 that may be shown on the display unit 70 during performance of the video poker routine 210 shown schematically in FIG. 4. Referring to FIG. 6, the display 350 may include video images 352 of a plurality of playing cards representing the player’s hand, such as five cards. To allow the player to control the play of the video poker game, a plurality of player-selectable buttons may be displayed. The buttons may include a “Hold” button 354 disposed directly below each of the playing card images 352, a “Cash Out” button 356, a “See Pays” button 358, a “Bet One Credit” button 360, a “Bet Max Credits” button 362, and a “Deal/Draw” button 364. The display 350 may also include an area 366 in which the number of remaining credits or value is displayed. If the display unit 70 is provided with a touch-sensitive screen, the buttons 354, 356, 358, 360, 362, 364 may form part of the video display 350. Alternatively, one or more of those buttons may be provided as part of a control panel that is provided separately from the display unit 70.

Figure 8:
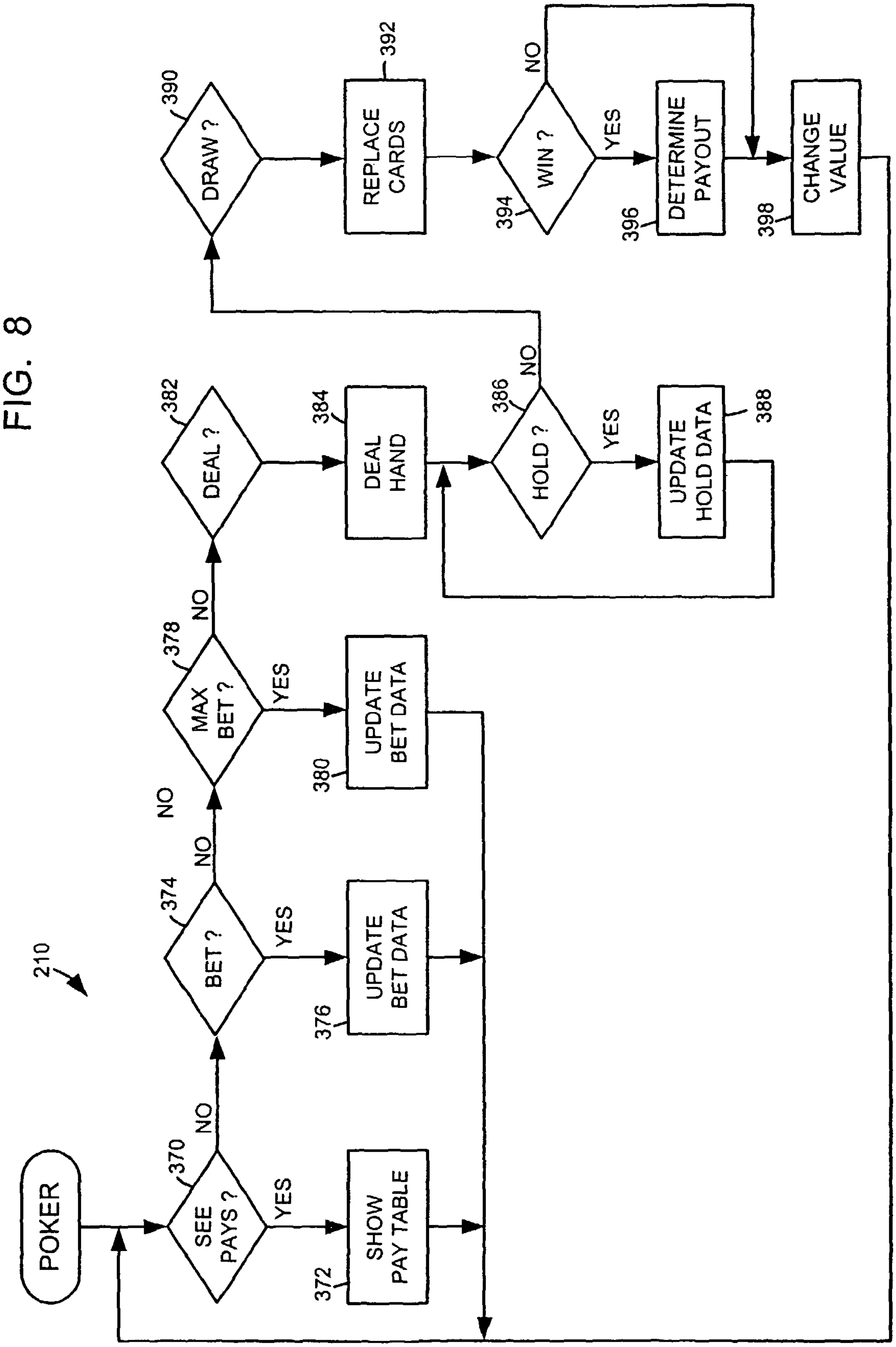
FIG. 8 is a flowchart of an embodiment of a video poker routine that may be performed by one or more of the gaming units.

FIG. 8 is a flowchart of the video poker routine 210 shown schematically in FIG. 4. Referring to FIG. 8, at block 370, the routine may determine whether the player has requested payout information, such as by activating the “See Pays” button 358, in which case at block 372 the routine may cause one or more pay tables to be displayed on the display unit 70. At block 374, the routine may determine whether the player has made a bet, such as by pressing the “Bet One Credit” button 360, in which case at block 376 bet data corresponding to the bet made by the player may be stored in the memory of the controller 100. At block 378, the routine may determine whether the player has pressed the “Bet Max Credits” button 362, in which case at block 380 bet data corresponding to the maximum allowable bet may be stored in the memory of the controller 100.

At block 382, the routine may determine if the player desires a new hand to be dealt, which may be determined by detecting if the “Deal/Draw” button 364 was activated after a wager was made. In that case, at block 384 a video poker hand may be “dealt” by causing the display unit 70 to generate the playing card images 352. After the hand is dealt, at block 386 the routine may determine if any of the “Hold” buttons 354 have been activated by the player, in which case data regarding which of the playing card images 352 are to be "held" may be stored in the controller 100 at block 388. If the "Deal/Draw" button 364 is activated again as determined at block 390, each of the playing card images 352 that was not "held" may be caused to disappear from the video display 350 and to be replaced by a new, randomly selected, playing card image 352 at block 392.

At block 394, the routine may determine whether the poker hand represented by the playing card images 352 currently displayed is a winner. That determination may be made by comparing data representing the currently displayed poker hand with data representing all possible winning hands, which may be stored in the memory of the controller 100. If there is a winning hand, a payout value corresponding to the winning hand may be determined at block 396. At block 398, the player's cumulative value or number of credits may be updated by subtracting the bet made by the player and adding, if the hand was a winner, the payout value determined at block 396. The cumulative value or number of credits may also be displayed in the display area 366 (FIG. 6).

Although the video poker routine 210 is described above in connection with a single poker hand of five cards, the routine 210 may be modified to allow other versions of poker to be played. For example, seven card poker may be played, or stud poker may be played. Alternatively, multiple poker hands may be simultaneously played. In that case, the game may begin by dealing a single poker hand, and the player may be allowed to hold certain cards. After deciding which cards to hold, the held cards may be duplicated in a plurality of different poker hands, with the remaining cards for each of those poker hands being randomly determined.

Video Blackjack

Figure 7:
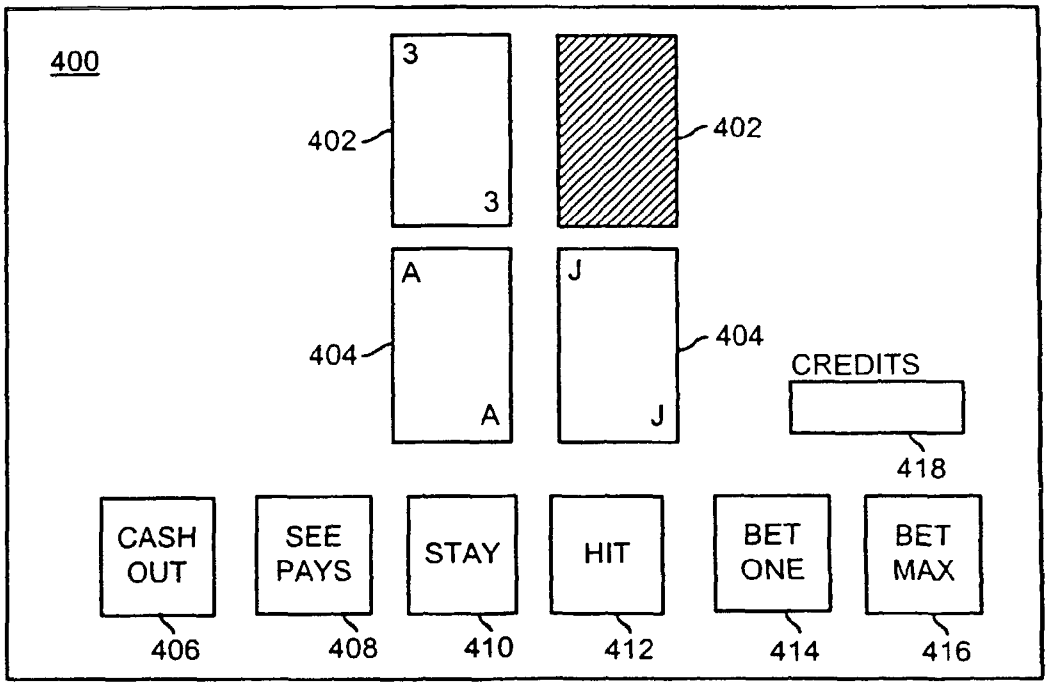
FIG. 7 is an illustration of an embodiment of a visual display that may be displayed during performance of the video blackjack routine of FIG. 9.

FIG. 7 is an exemplary display 400 that may be shown on the display unit 70 during performance of the video blackjack routine 220 shown schematically in FIG. 4. Referring to FIG. 7, the display 400 may include video images 402 of a pair of playing cards representing a dealer's hand, with one of the cards shown face up and the other card being shown face down, and video images 404 of a pair of playing cards representing a player's hand, with both the cards shown face up. The "dealer" may be the gaming unit 20.

To allow the player to control the play of the video blackjack game, a plurality of player-selectable buttons may be displayed. The buttons may include a "Cash Out" button 406, a "See Pays" button 408, a "Stay" button 410, a "Hit" button 412, a "Bet One Credit" button 414, and a "Bet Max Credits" button 416. The display 400 may also include an area 418 in which the number of remaining credits or value is displayed. If the display unit 70 is provided with a touch-sensitive screen, the buttons 406, 408, 410, 412, 414, 416 may form part of the video display 400. Alternatively, one or more of those buttons may be provided as part of a control panel that is provided separately from the display unit 70.

Figure 9:
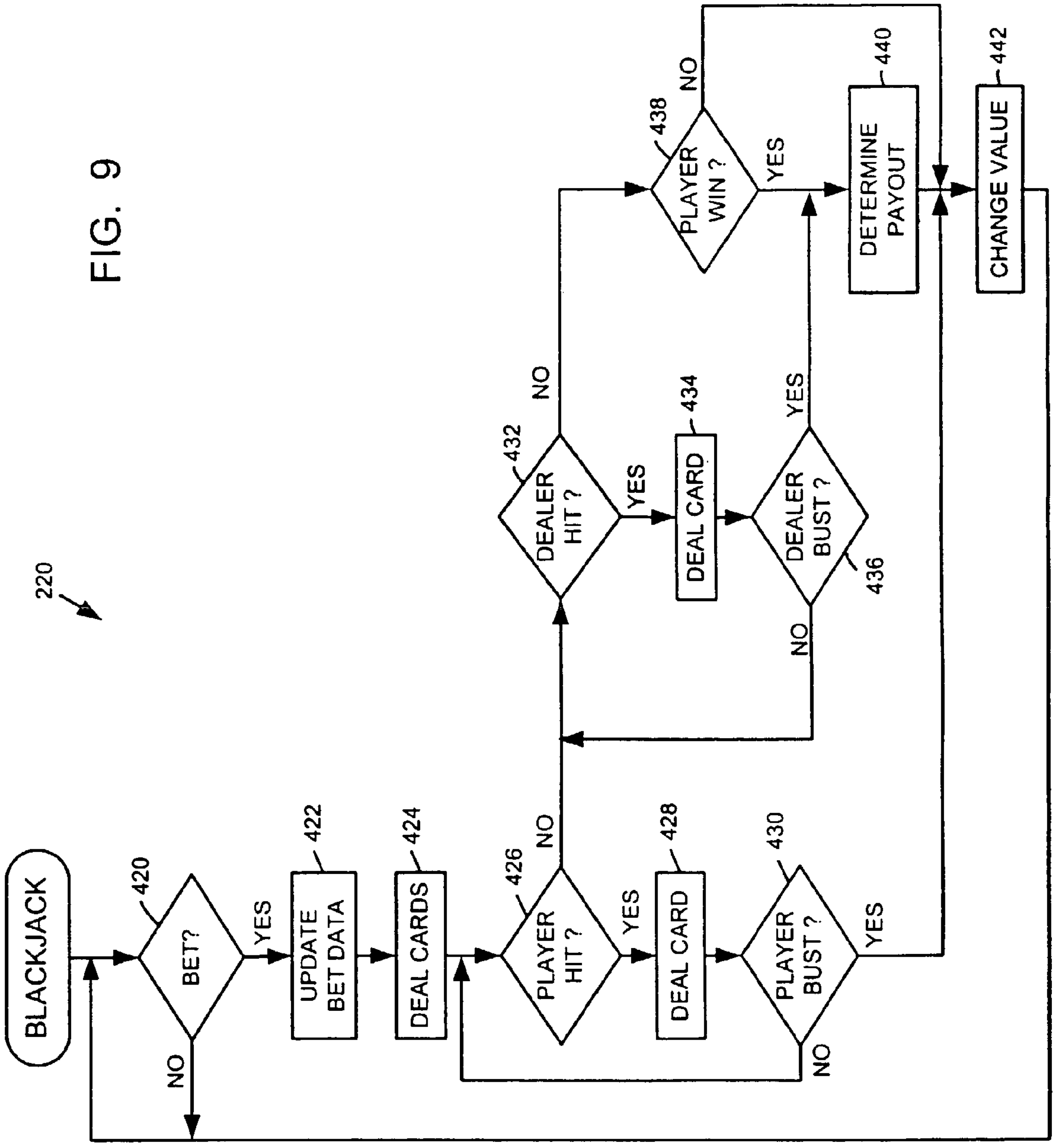
FIG. 9 is a flowchart of an embodiment of a video blackjack routine that may be performed by one or more of the gaming units.

FIG. 9 is a flowchart of the video blackjack routine 220 shown schematically in FIG. 4. Referring to FIG. 9, the video blackjack routine 220 may begin at block 420 where it may determine whether a bet has been made by the player. That may be determined, for example, by detecting the activation of either the "Bet One Credit" button 414 or the "Bet Max Credits" button 416. At block 422, bet data corresponding to the bet made at block 420 may be stored in the memory of the controller 100. At block 424, a dealer's hand and a player's hand may be "dealt" by making the playing card images 402, 404 appear on the display unit 70.

At block 426, the player may be allowed to be "hit," in which case at block 428 another card will be dealt to the player's hand by making another playing card image 404 appear in the display 400. If the player is hit, block 430 may determine if the player has "bust," or exceeded 21. If the player has not bust, blocks 426 and 428 may be performed again to allow the player to be hit again.

If the player decides not to hit, at block 432 the routine may determine whether the dealer should be hit. Whether the dealer hits may be determined in accordance with predetermined rules, such as the dealer always hit if the dealer's hand totals 15 or less. If the dealer hits, at block 434 the dealer's hand may be dealt another card by making another playing card image 402 appear in the display 400. At block 436 the routine may determine whether the dealer has bust. If the dealer has not bust, blocks 432, 434 may be performed again to allow the dealer to be hit again.

If the dealer does not hit, at block 436 the outcome of the blackjack game and a corresponding payout may be determined based on, for example, whether the player or the dealer has the higher hand that does not exceed 21. If the player has a winning hand, a payout value corresponding to the winning hand may be determined at block 440. At block 442, the player's cumulative value or number of credits may be updated by subtracting the bet made by the player and adding, if the player won, the payout value determined at block 440. The cumulative value or number of credits may also be displayed in the display area 418 (FIG. 7).

Slots

FIG. 10 is an exemplary display 450 that may be shown on the display unit 70 during performance of the slots routine 230 shown schematically in FIG. 4. Referring to FIG. 10, the display 450 may include video images 452 of a plurality of slot machine reels, each of the reels having a plurality of reel symbols 454 associated therewith. Although the display 450 shows five reel images 452, each of which may have three reel symbols 454 that are visible at a time, other reel configurations could be utilized.

To allow the player to control the play of the slots game, a plurality of player-selectable buttons may be displayed. The buttons may include a "Cash Out" button 456, a "See Pays" button 458, a plurality of payline-selection buttons 460 each of which allows the player to select a different number of paylines prior to "spinning" the reels, a plurality of bet-selection buttons 462 each of which allows a player to specify a wager amount for each payline selected, a "Spin" button 464, and a "Max Bet" button 466 to allow a player to make the maximum wager allowable.

Figure 12:
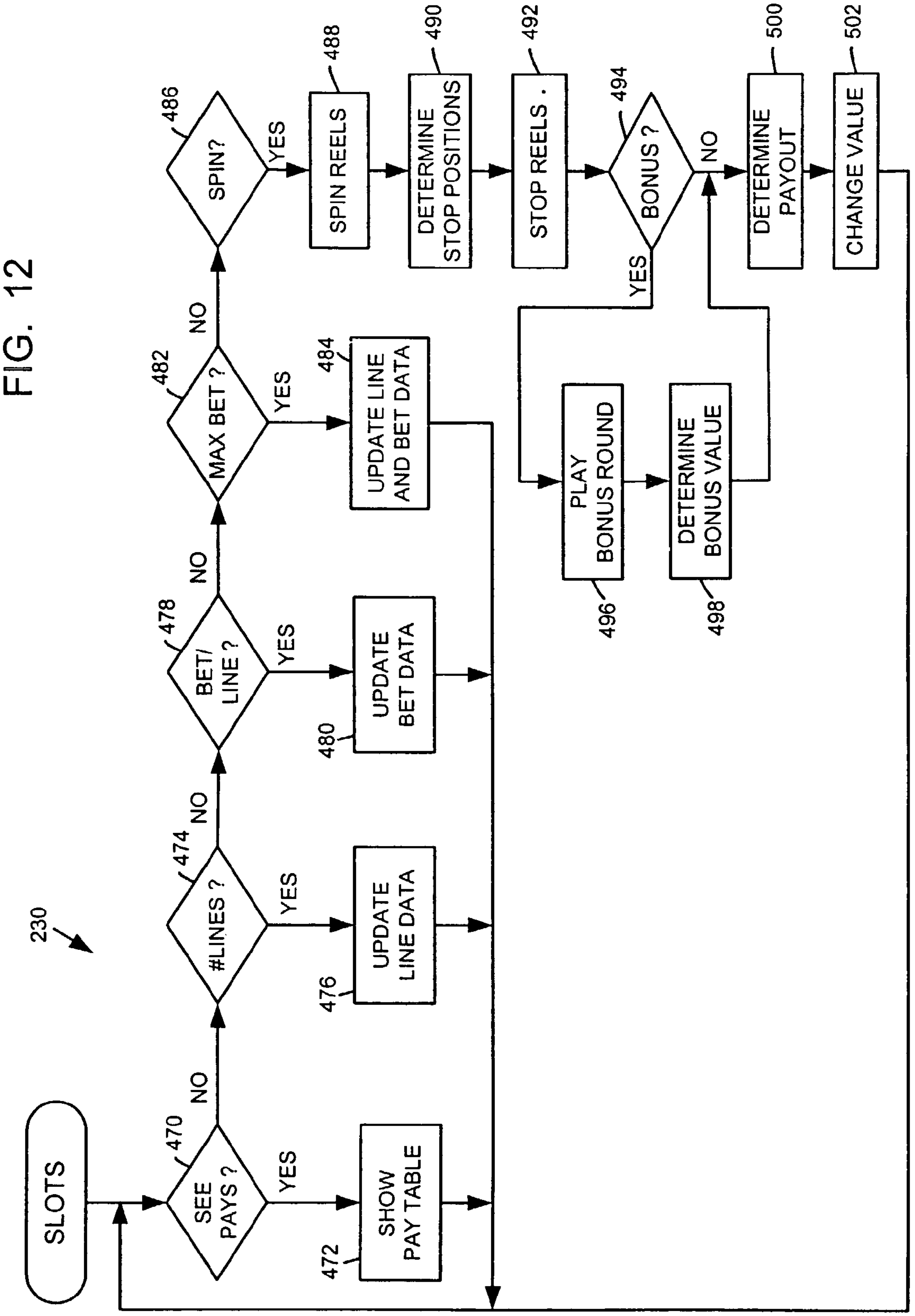
FIG. 12 is a flowchart of an embodiment of a slots routine that may be performed by one or more of the gaming units.

FIG. 12 is a flowchart of the slots routine 230 shown schematically in FIG. 10. Referring to FIG. 12, at block 470, the routine may determine whether the player has requested payout information, such as by activating the "See Pays" button 458, in which case at block 472 the routine may cause one or more pay tables to be displayed on the display unit 70. At block 474, the routine may determine whether the player has pressed one of the payline-selection buttons 460, in which case at block 476 data corresponding to the number of paylines selected by the player may be stored in the memory of the controller 100. At block 478, the routine may determine whether the player has pressed one of the bet-selection buttons 462, in which case at block 480 data corresponding to the amount bet per payline may be stored in the memory of the controller 100. At block 482, the routine may determine whether the player has pressed the "Max Bet" button 466, in which case at block 484 bet data (which may include both payline data and bet-per-payline data) corresponding to the maximum allowable bet may be stored in the memory of the controller 100.

If the "Spin" button 464 has been activated by the player as determined at block 486, at block 488 the routine may cause the slot machine reel images 452 to begin "spinning" so as to simulate the appearance of a plurality of spinning mechanical slot machine reels. At block 490, the routine may determine the positions at which the slot machine reel images will stop, or the particular symbol images 454 that will be displayed when the reel images 452 stop spinning. At block 492, the routine may stop the reel images 452 from spinning by displaying stationary reel images 452 and images of three symbols 454 for each stopped reel image 452. The virtual reels may be stopped from left to right, from the perspective of the player, or in any other manner or sequence.

The routine may provide for the possibility of a bonus game or round if certain conditions are met, such as the display in the stopped reel images 452 of a particular symbol 454. If there is such a bonus condition as determined at block 494, the routine may proceed to block 496 where a bonus round may be played. The bonus round may be a different game than slots, and many other types of bonus games could be provided. If the player wins the bonus round, or receives additional credits or points in the bonus round, a bonus value may be determined at block 498. A payout value corresponding to outcome of the slots game and/or the bonus round may be determined at block 500. At block 502, the player's cumulative value or number of credits may be updated by subtracting the bet made by the player and adding, if the slot game and/or bonus round was a winner, the payout value determined at block 500.

Although the above routine has been described as a virtual slot machine routine in which slot machine reels are represented as images on the display unit 70, actual slot machine reels that are capable of being spun may be utilized instead.

Video Keno

FIG. 11 is an exemplary display 520 that may be shown on the display unit 70 during performance of the video keno routine 240 shown schematically in FIG. 4. Referring to FIG. 11, the display 520 may include a video image 522 of a plurality of numbers that were selected by the player prior to the start of a keno game and a video image 524 of a plurality of numbers randomly selected during the keno game. The randomly selected numbers may be displayed in a grid pattern.

To allow the player to control the play of the keno game, a plurality of player-selectable buttons may be displayed. The buttons may include a "Cash Out" button 526, a "See Pays" button 528, a "Bet One Credit" button 530, a "Bet Max Credits" button 532, a "Select Ticket" button 534, a "Select Number" button 536, and a "Play" button 538. The display 520 may also include an area 540 in which the number of remaining credits or value is displayed. If the display unit 70 is provided with a touch-sensitive screen, the buttons may form part of the video display 520. Alternatively, one or more of those buttons may be provided as part of a control panel that is provided separately from the display unit 70.

Figure 13:
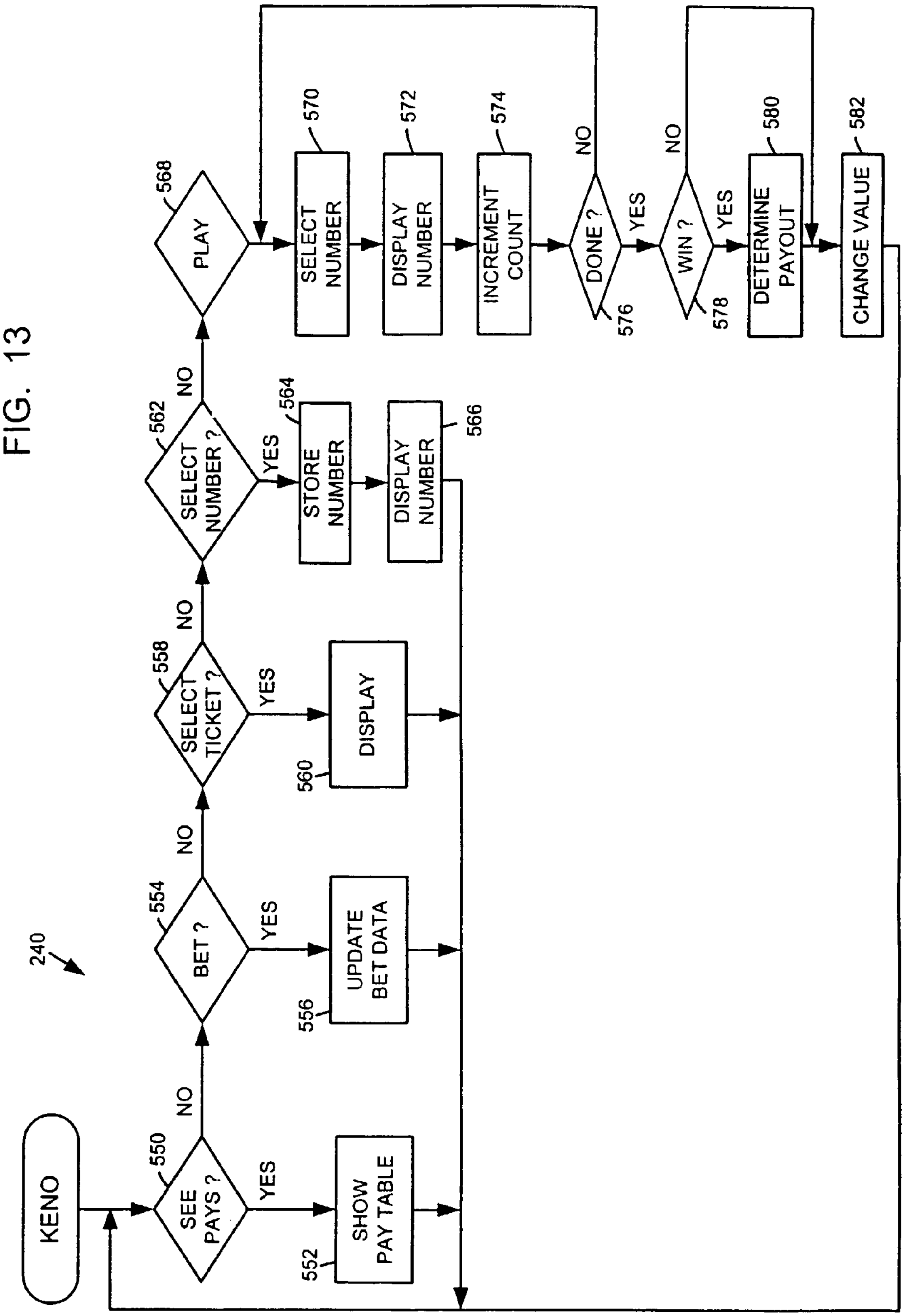
FIG. 13 is a flowchart of an embodiment of a video keno routine that may be performed by one or more of the gaming units.

FIG. 13 is a flowchart of the video keno routine 240 shown schematically in FIG. 4. The keno routine 240 may be utilized in connection with a single gaming unit 20 where a single player is playing a keno game, or the keno routine 240 may be utilized in connection with multiple gaming units 20 where multiple players are playing a single keno game. In the latter case, one or more of the acts described below may be performed either by the controller 100 in each gaming unit or by one of the network computer 22, 32 to which multiple gaming units 20 are operatively connected.

Referring to FIG. 13, at block 550, the routine may determine whether the player has requested payout information, such as by activating the "See Pays" button 528, in which case at block 552 the routine may cause one or more pay tables to be displayed on the display unit 70. At block 554, the routine may determine whether the player has made a bet, such as by having pressed the "Bet One Credit" button 530 or the "Bet Max Credits" button 532, in which case at block 556 bet data corresponding to the bet made by the player may be stored in the memory of the controller 100. After the player has made a wager, at block 558 the player may select a keno ticket, and at block 560 the ticket may be displayed on the display 520. At block 562, the player may select one or more game numbers, which may be within a range set by the casino. After being selected, the player's game numbers may be stored in the memory of the controller 100 at block 564 and may be included in the image 522 on the display 520 at block 566. After a certain amount of time, the keno game may be closed to additional players (where a number of players are playing a single keno game using multiple gambling units 20).

If play of the keno game is to begin as determined at block 568, at block 570 a game number within a range set by the casino may be randomly selected either by the controller 100 or a central computer operatively connected to the controller, such as one of the network computers 22, 32. At block 572, the randomly selected game number may be displayed on the display unit 70 and the display units 70 of other gaming units 20 (if any) which are involved in the same keno game. At block 574, the controller 100 (or the central computer noted above) may increment a count which keeps track of how many game numbers have been selected at block 570.

At block 576, the controller 100 (or one of the network computers 22, 32) may determine whether a maximum number of game numbers within the range have been randomly selected. If not, another game number may be randomly selected at block 570. If the maximum number of game numbers has been selected, at block 578 the controller 100 (or a central computer) may determine whether there are a sufficient number of matches between the game numbers selected by the player and the game numbers selected at block 570 to cause the player to win. The number of matches may depend on how many numbers the player selected and the particular keno rules being used.

If there are a sufficient number of matches, a payout may be determined at block 580 to compensate the player for winning the game. The payout may depend on the number of matches between the game numbers selected by the player and the game numbers randomly selected at block 570. At block 582, the player's cumulative value or number of credits may be updated by subtracting the bet made by the player and adding, if the keno game was won, the payout value determined at block 580. The cumulative value or number of credits may also be displayed in the display area 540 (FIG. 11).

Video Bingo

Figure 14:
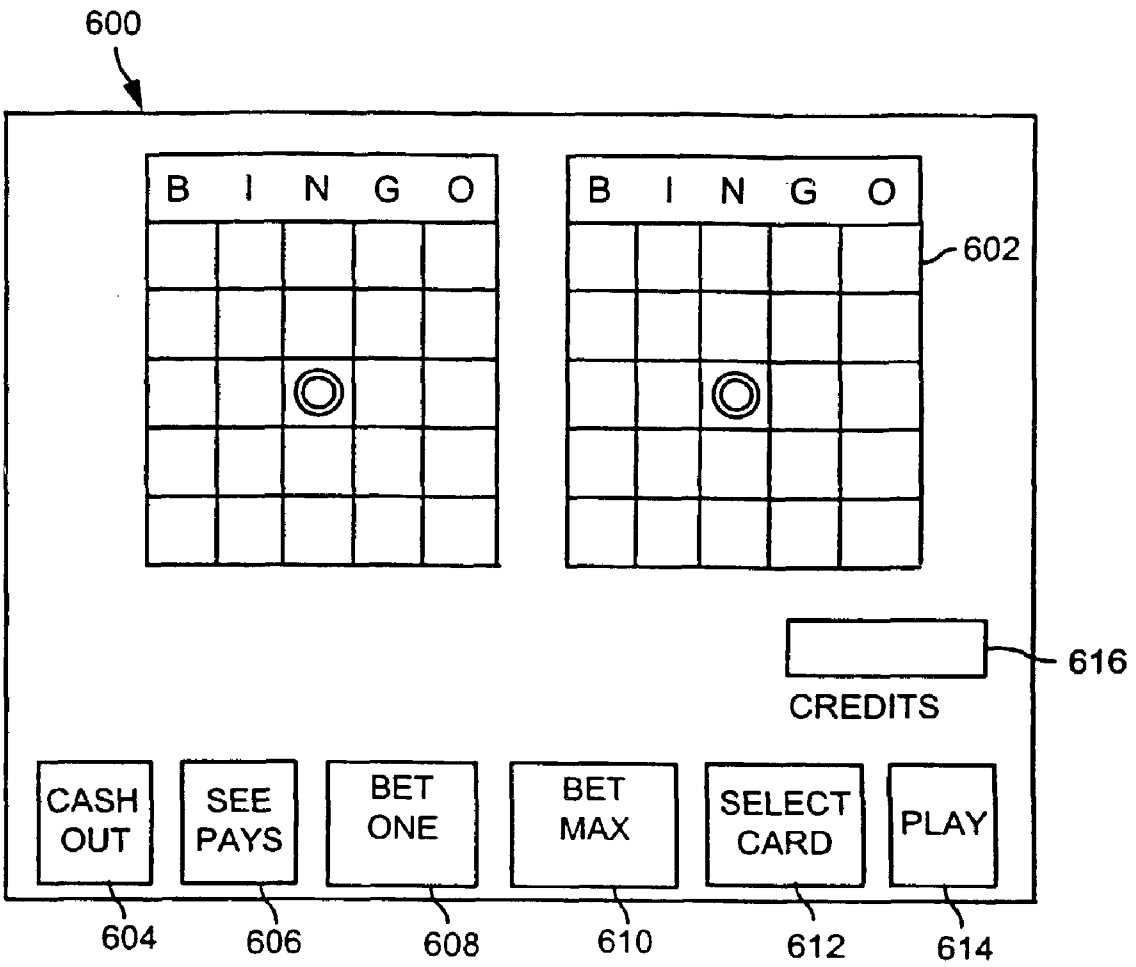
FIG. 14 is an illustration of an embodiment of a visual display that may be displayed during performance of the video bingo routine of FIG. 15.

FIG. 14 is an exemplary display 600 that may be shown on the display unit 70 during performance of the video bingo routine 250 shown schematically in FIG. 4. Referring to FIG. 14, the display 600 may include one or more video images 602 of a bingo card and images of the bingo numbers selected during the game. The bingo card images 602 may have a grid pattern.

To allow the player to control the play of the bingo game, a plurality of player-selectable buttons may be displayed. The buttons may include a “Cash Out” button 604, a “See Pays” button 606, a “Bet One Credit” button 608, a “Bet Max Credits” button 610, a “Select Card” button 612, and a “Play” button 614. The display 600 may also include an area 616 in which the number of remaining credits or value is displayed. If the display unit 70 is provided with a touch-sensitive screen, the buttons may form part of the video display 600. Alternatively, one or more of those buttons may be provided as part of a control panel that is provided separately from the display unit 70.

Figure 15:
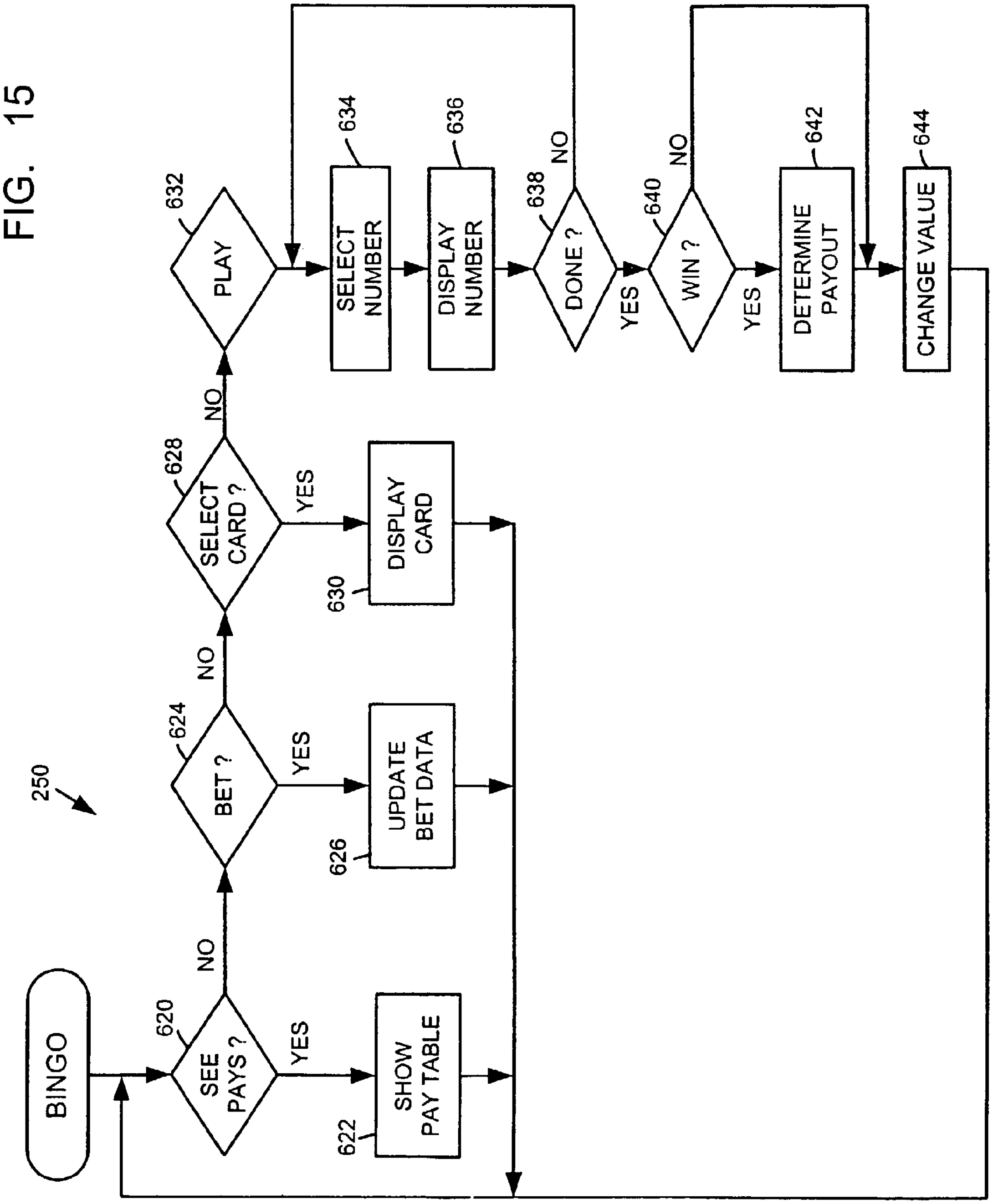
FIG. 15 is a flowchart of an embodiment of a video bingo routine that may be performed by one or more of the gaming units.

FIG. 15 is a flowchart of the video bingo routine 250 shown schematically in FIG. 4. The bingo routine 250 may be utilized in connection with a single gaming unit 20 where a single player is playing a bingo game, or the bingo routine 250 may be utilized in connection with multiple gaming units 20 where multiple players are playing a single bingo game. In the latter case, one or more of the acts described below may be performed either by the controller 100 in each gaming unit 20 or by one of the network computers 22, 32 to which multiple gaming units 20 are operatively connected.

Referring to FIG. 15, at block 620, the routine may determine whether the player has requested payout information, such as by activating the “See Pays” button 606, in which case at block 622 the routine may cause one or more pay tables to be displayed on the display unit 70. At block 624, the routine may determine whether the player has made a bet, such as by having pressed the “Bet One Credit” button 608 or the “Bet Max Credits” button 610, in which case at block 626 bet data corresponding to the bet made by the player may be stored in the memory of the controller 100.

After the player has made a wager, at block 628 the player may select a bingo card, which may be generated randomly. The player may select more than one bingo card, and there may be a maximum number of bingo cards that a player may select. After play is to commence as determined at block 632, at block 634 a bingo number may be randomly generated by the controller 100 or a central computer such as one of the network computers 22, 32. At block 636, the bingo number may be displayed on the display unit 70 and the display units 70 of any other gaming units 20 involved in the bingo game.

At block 638, the controller 100 (or a central computer) may determine whether any player has won the bingo game. If no player has won, another bingo number may be randomly selected at block 634. If any player has bingo as determined at block 638, the routine may determine at block 640 whether the player playing that gaming unit 20 was the winner. If so, at block 642 a payout for the player may be determined. The payout may depend on the number of random numbers that were drawn before there was a winner, the total number of winners (if there was more than one player), and the amount of money that was wagered on the game. At block 644, the player's cumulative value or number of credits may be updated by subtracting the bet made by the player and adding, if the bingo game was won, the payout value determined at block 642. The cumulative value or number of credits may also be displayed in the display area 616 (FIG. 14).

Group Bonus Round

During performance of the main operating routine 200 or the alternative main operating routine 300 as described above, the controller 100 may initiate a group bonus round sequence utilizing the light bezel 84. For example, the controller 100 may initiate the group bonus round sequence during the bonus round played at the block 496 of FIG. 12. The group bonus round sequence may be played, for example, by gaming system 10 as illustrated in FIG. 1. While the group bonus round sequence is described in connection with the bonus round played at the block 496, it will be appreciated that the group bonus round may be initiated in any number of ways, including, for example, by a random or preset timer controlled by the gaming system 10, by the outcome of a single game play on any one gaming unit 20, by manual initiation by the operator of the gaming system 10, or via the achievement of a predetermined level on a progressive jackpot of a gaming system 10. Furthermore, while the group bonus round sequence is described as utilizing the light bezel 84, it will be appreciated that the group bonus round sequence may utilize any component of this gaming unit 20, including, for example, the components 71, 86, 88, 90 and 92.

Figure 16:
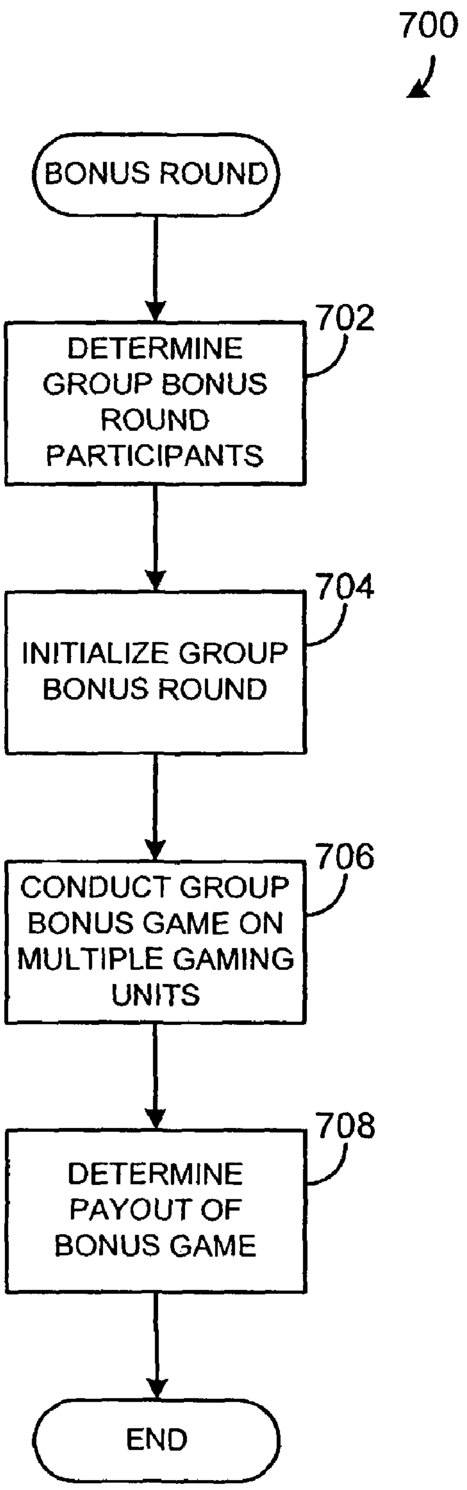
FIG. 16 is a flowchart of a embodiment of a group bonus round routine that may be performed during the group bonus round of FIG. 12.

FIG. 16 is a flowchart of a main group bonus round operating routine 700 that may be stored in the memory of the controller 100 of one of the gaming units 20, or alternatively the controller 100 of the network computer 22, to initiate the group bonus round sequence. Referring to FIG. 16, the main routine 700 may begin operation at a block 702 during which the routine 700 may determine the participants who may be eligible to participate in the group bonus round. To determine the eligible bonus game participants, the routine 700 may poll the gaming units 20 attached to the gaming system 10 to determine which gaming units 20 may qualify for the group bonus round.

To determine which gaming units 20 may qualify for the group bonus round, the controller 100 may utilize predetermined criteria. For example, in one embodiment, the controller 100 may determine that all gaming units 20 that are linked to the gaming system 10 and have players with deposited value in their respective gaming units 20 at that particular moment may qualify. In another embodiment, the controller 100 may determine that all gaming units 20 that have been predetermined by the operator of the gaming system 10 to be eligible for the group bonus game and have players with deposited value in their respective machines at that particular moment may qualify for the group bonus round.

In yet another embodiment, the controller 100 may determine that only gaming units 20 that are linked to the gaming system 10 and have players with player tracking cards inserted into the card reader 58 may be eligible for the group bonus round. In still another embodiment, the controller 100 may determine that a random or selected subset of gaming units 20 having players with active value on their respective machines at that particular moment may qualify for the group bonus round.

In still yet another embodiment, the controller 100 may first determine the gaming units 20 that may have players that are eligible for the group bonus round, and then present the identified players with the opportunity to opt-out of the group bonus round. For example, for each identified eligible player, the controller 100 may initiate a display on the video display unit 70 of the gaming unit 20, asking the player if they would like to participate in the group bonus round. The player may then choose to either participate or to pass on participation, by for example, making a selection on one of the buttons 76, 78 of the input control panel 66. It will be appreciated that players wishing to participate in the group bonus round may be required to provide an additional wager of value.

Figure 17:
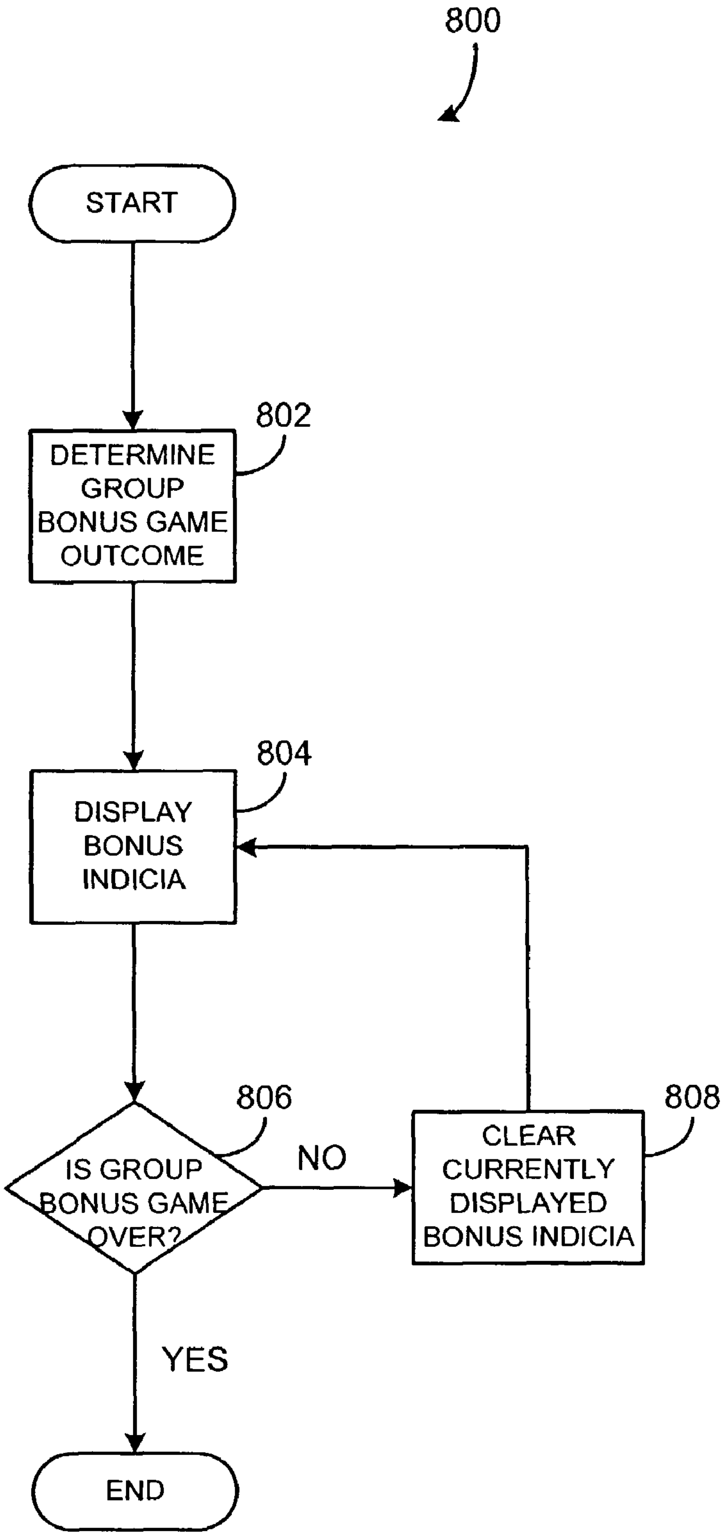
FIG. 17 is a flowchart of an embodiment of a bonus game routine that may be performed during the group bonus round routine of FIG. 16.
Figure 18:
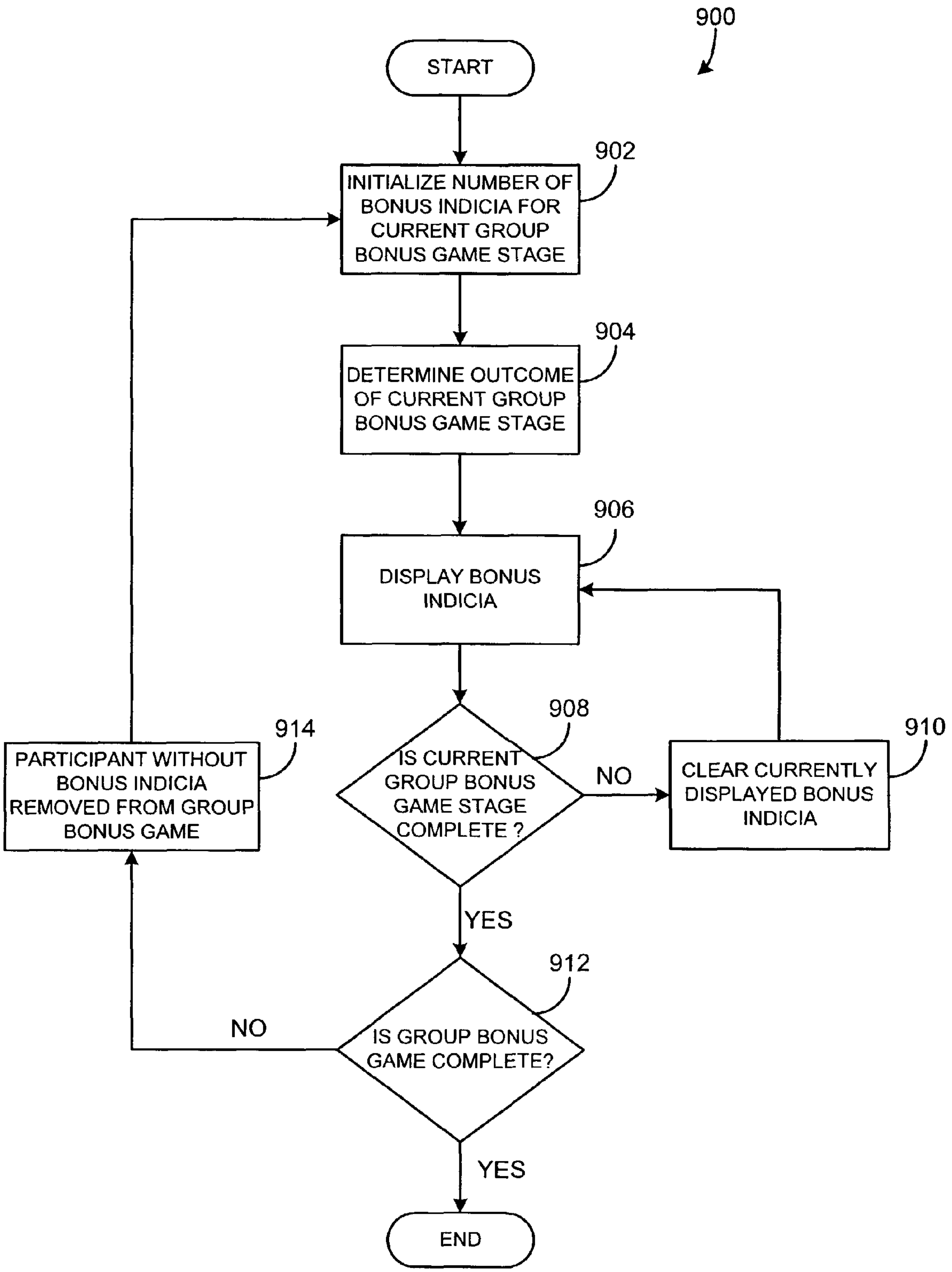
FIG. 18 is a flowchart of another embodiment of a bonus game routine that may be performed during the group bonus round routine of FIG. 16.

Once the bonus game participants have been determined, the controller 100 may initialize the bonus game at a block 704 by signaling the beginning of the group bonus round. To initialize the group bonus game, the gaming system 10 may generate audio on the speakers 62, and/or generate a visual display on one or more of the light bezel 84, the color video display unit 70, the lighted bolster 86, the lighted topbox 88, the topper 90, the lighted gaming candle 92, or other similar component. It will be appreciated that to enhance the group bonus round experience, various rates and intensities of light and/or sound may be generated by the components 62, 84, 70, 86, 88, 90, 92. Moreover, different combinations of light, sound and music may be generated to add further excitement to the group bonus round. After initializing the group bonus round, the actual bonus game may be played at a block 706. FIGS. 17 and 18 are two exemplary embodiments of group bonus games and are described in detail below. It will be appreciated that the controller 100 may terminate the bonus game at any time due to lack of a minimum number of eligible participants.

Once the actual bonus game play is completed, the controller 100 may determine the proper payout for the group bonus game round. A payout for the winning player may depend on the type of game played, the number of participating gaming units, the total number of winners (if there was more than one winner), or the amount of money that was wagered on the bonus game. The payout may also reward different players for different action before and/or during the group bonus round. For example, if the group bonus round was initiated from a specific gaming unit 20, the payout may reward the initiating player even though that player may not have won the actual bonus game. In this manner, the initiating player may be able to contribute to the overall excitement of the gaming system 10 by initiating a group bonus round, while still feeling rewarded if they are not the ultimate bonus winner.

Once the determination of the bonus payout is complete, the gaming units 20 in the gaming system 10 may return to normal operations. While the operating routine 700 is described as being modal, i.e., completely controlling the gaming unit play, it will be appreciated that the group bonus round may be non-modal in that the normal operation of the gaming unit may not be interrupted during the group bonus round play. For example, the group bonus rounds described below and the normal gaming operation previously described may be played simultaneously on each of the participating gaming units 20.

Turning now to FIG. 17, there is illustrated a flowchart of an embodiment of a group bonus game operating routine 800 that may be stored in the memory of the controller 100 of one of the gaming units 20, or alternatively the controller 100 of the network computer 22, to play the actual group bonus game sequence of the block 706. Referring to FIG. 17, the group bonus game 800 may begin by determining the outcome of the group bonus game 800 at a block 802. For example, the controller 100 may choose the gaming unit 20, or plurality of gaming units 20 that may ultimately be considered the winner of the group bonus game 800. It will be appreciated that the determination of the outcome of the group bonus game 800 may be performed at any point during the operation of the group bonus game 800 and may be determined by any known means of selecting the outcome of a gaming operation.

At a block 804, the group bonus game 800 may be played by displaying a bonus indicia on a subset of the participating gaming units 20 of the gaming system 10. The subset of gaming units 20 may include any number of gaming units 20 within the gaming system 10, including any number from the minimum, to the maximum number of participating gaming units 20. The bonus indicia may comprise a symbol generated on the light bezel 84 or may alternatively comprise a symbol generated on one or more of the video display unit 70, the lighted bolster 86, the lighted topbox 88, the topper 90, the lighted gaming candle 92, or other similar component. The bonus indicia display at the block 802, may further include an indicator of the bonus game progress. For example, the bonus indicia displayed may display an indicator representative of an "in-progress" game, or may display an indicator of a "completed" game, i.e., bonus award. The display of the bonus indicia may further be accompanied by a sound generated on the speakers 62.

In yet another example, the bonus indicia displayed may be an animated or static bonus symbol displayed on the video display unit 70, or other similar component. For instance, and not by way of limitation, the bonus symbol displayed may be a cartoon character, a train, scrolling or static letters, a caricature, a video, a picture, a portrait, or other similar symbol. The bonus symbol may also scroll, or travel from one gaming unit 20 to another gaming unit 20 as is described in detail below. Moreover, It will be appreciated that since the bonus indicia may be displayed on the video display unit 70, the main operating routine 200 may be interrupted, either temporarily or for the duration of the bonus symbol display, to accommodate the bonus indicia.

Once the bonus indicia has been displayed, at a block 806, the group bonus game operating routine 800, may determine whether the current group bonus game 800 is over. If so, the group bonus game 800 may terminate and the current bonus indicia displayed may indicate the outcome of the group bonus game 800. If, however, current group bonus game 800 is not over, the current displayed bonus indicia may be cleared at a block 808. Once cleared, the controller 100 may then return to the block 804 to display the next bonus indicia on another subset of gaming units 20, thereby continuing the group bonus game 800 play.

In one embodiment, the blocks 804, 806, and 808 may combine to produce an illusion that a bonus indicator is "rotating" or "spinning" around the gaming system 10 before stopping at a specific gaming unit 20 to produce a group bonus game 800 winner. For example, in the above embodiment, the bonus indicia generated at the block 804 may be displayed on a first gaming unit 20 by lighting the light bezel 84 and/or generating an accompanying sound on the speakers 62. At the block 808, the generated bonus indicia may be extinguished on the first gaming unit 20, and the same, or modified, bonus indicia may be produced upon the gaming unit 20 directly adjacent the first. The process is then repeated so that the bonus indicia is generated on the third gaming unit 20, etc. In this manner, the illusion of a traveling bonus indicator is generated, and the bonus indicator may then travel around the gaming system 10, creating excitement and anticipation, until it stops on a specific gaming unit 20 to indicate a winner of the group bonus game 800.

FIG. 18, is a flowchart of another embodiment of a group bonus game operating routine 900 that may be stored in the memory of the controller 100 of one of the gaming units 20, or alternatively the controller 100 of the network computer 22, to play the actual group bonus game sequence of the block 706. The group bonus game operation routine 900 illustrated in FIG. 19 may be played in a plurality of bonus game stages, as will be described below.

Referring to FIG. 18, the group bonus game 100 may begin by initializing the number of gaming units which will display bonus indicia for the current bonus game stage at a block 902. For example, the number of gaming units 20 which will display bonus indicia may be initialized to be one less than the number of group bonus round participants, as determined in the block 702. Once the number of bonus indicia are determined, the outcome of the current group bonus game stage may be determined at a block 904. For example, the controller 100 may choose the gaming unit 20, or plurality of gaming units 20 that may ultimately be considered the "winner" of the current group bonus game stage. It will be appreciated that the determination of the outcome of the current group bonus game stage may be performed at any point during operation, and may be determined by any known means of selecting the outcome of a gaming operation.

At a block 906, the bonus stage may be commenced by displaying bonus indicia on the number of gaming units 20 of the gaming system 10 determined by the block 902. As in the previous embodiment, the bonus indicia may comprise a symbol generated on the light bezel 84, or may alternatively comprise a symbol generated on the one or more of the color video display unit 70, the lighted bolster 86, the lighted top-box 88, the topper 90, the lighted gaming candle 92, or other similar component. The bonus indicia display at the block 802, may further include an indicator of the bonus game progress. For example, the bonus indicia displayed may display an indicator representative of an "in-progress" game, or may display an indicator of a "completed" game, i.e., a bonus award. The display of the bonus indicia may further be accompanied by a sound generated on the speakers 62.

Once the bonus indicia has been displayed, at a block 908, the group bonus game operating routine 900 may determine whether the current group bonus game stage is over at a block 908. If so, the bonus indicia displayed indicate the outcome of the group bonus game stage, and the group bonus game 900 may determine if the group bonus game is complete at a block 912, as described below. Otherwise, if the current group bonus game stage is not complete, the current displayed bonus indicia may be cleared at a block 808. Once cleared, the controller 100 may then return to the block 804 to display the next bonus indicia on another subset of gaming units 20, thereby continuing the group bonus game 800 play.

As indicated above, if, at the block 908, it is determined that the group bonus stage game is over, the group bonus game 900 may determine if the group bonus game is complete at a block 912. If it is determined the group bonus game is complete, the group bonus game is terminated and the current bonus indicia displayed may indicate the outcome of the group bonus game 900. Otherwise, the participants whose gaming units 20 do not display any bonus indicia may be removed from the group bonus game at a block 914, and the routine 900 may return to the block 902 to continue to the next stage of the group bonus game.

In one embodiment, the blocks 902-914 may combine to produce a group bonus game played similar to a traditional "musical chairs" game. For example, in the above embodiment, the routine 900 may first generate bonus indicia on one fewer than all the gaming units 20 having a participant in the group bonus game. The routine 900 may then play music on each of the participants speakers 62 while creating an illusion of the bonus indicia "traveling" around the gaming system 10 similar to the embodiment of FIG. 17. The routine 900 may then stop the music, concluding the group bonus game stage. The participants whose gaming units 20 still display the bonus indicia may be allowed to continue, while the gaming units 20 with no bonus indicia displayed may be eliminated from the group bonus game. The routine 900 may then continue with the next group bonus game stage. In this manner, each round of the bonus game may be played similar to a traditional "musical chairs" game in which a participant is eliminated in each stage, resulting in the creation of excitement and anticipation, until a specific gaming unit 20 is deemed the winner of the group bonus game 900.

What is claimed is:

1. A gaming system for generating a gaming system bonus game, said gaming system comprising:

a plurality of gaming apparatuses, each of said plurality of gaming apparatuses comprising:
  - a display unit that is capable of generating video images;
  - a value input device;
  - a light device having at least one independently operable light;
  - a gaming apparatus controller operatively coupled to said display unit, said light device, and said value input device, said gaming apparatus controller comprising a processor and a memory operatively coupled to said processor,
  - said gaming apparatus controller being programmed to allow a player to make a wager,
  - said gaming apparatus controller being programmed to cause a video image to be generated on said display unit, said video image representing a game,
  - said gaming apparatus controller being programmed to determine, after said video image has been displayed, a value payout associated with an outcome of said game represented by said video image; and
  - a gaming system controller operatively coupled to each of said plurality of gaming apparatuses, said gaming system controller comprising a processor and a memory;
  - said gaming system controller being programmed to initiate a gaming system bonus game comprising a plurality of stages that operate in succession to one another, wherein said gaming system bonus game is initiated by said gaming system controller in response to a signal issued by said gaming apparatus controller to said gaming system controller without being polled by said gaming system controller,
  - said gaming system controller being programmed to determine the eligibility of each of said plurality of gaming apparatuses to participate in said gaming system bonus game, wherein the number of the plurality of stages is equal to one less than the number of the eligible gaming apparatuses,
  - said gaming system controller being programmed to determine an outcome of said gaming system bonus game,
  - said gaming system controller being programmed to cause said light devices of a first subset of said eligible gaming apparatuses to be in a bonus state in at least a first stage of the plurality of stages by generating a bonus indicia on said light devices of said eligible gaming apparatuses in said first subset,
  - said gaming system controller being program to extinguish the bonus indicia on said light devices of said eligible gaming apparatuses in said first subset,
  - said gaming system controller being programmed to cause said light devices of a second subset of said eligible gaming apparatuses to be in a bonus state in the at least first stage of the plurality of stages by generating the bonus indicia on said light devices of said eligible gaming apparatuses on said second subset,
  - said gaming system controller being programmed to extinguish the bonus indicia on said light devices of said eligible gaming apparatuses on said second subset,
  - said gaming system controller being programmed to re-determine eligibility of each of said plurality of gaming apparatuses at the conclusion of each stage, where the total number of eligible gaming apparatuses decreases for each stage after the at least first stage of the plurality of stages, said gaming system controller being programmed to determine if the number of eligible gaming apparatuses participating in the gaming system bonus game at a conclusion of each stage is equal to, greater than, or less than a predetermined number of eligible gaming apparatuses, and to conclude play of said gaming system bonus game when the number of eligible gaming apparatuses is less than the predetermined number, wherein the predetermined number is always greater than or equal to one, said gaming system controller being programmed to continue generating and extinguishing the bonus indicia on said light devices on each re-determined eligible gaming apparatus of the plurality of gaming apparatuses during each subsequent stage of the plurality of stages that operate in succession to one another, said gaming system controller being programmed to conclude play of said gaming system bonus game by only generating the bonus indicia on a gaming apparatus of said re-determined eligible gaming apparatuses determined to be the winner of said gaming system bonus game; and said gaming system controller being programmed to determine a value payout associated with the outcome of said gaming system bonus game.

2. A gaming system as defined in claim 1, wherein said bonus state comprises a bonus image displayed on said light device.

3. A gaming system as defined in claim 1, wherein said bonus state comprises the illumination of said at least one independently operable light of said light device.

4. A gaming system as defined in claim 1, wherein said plurality of gaming apparatuses are arranged in a generally circular physical arrangement, and wherein said second subset of said plurality of gaming apparatuses is adjacent said first subset of said plurality of gaming apparatuses.

5. A gaming system as defined in claim 1, wherein said first subset of said plurality of gaming apparatuses and said second subset of said plurality of gaming apparatuses are exclusive of each other.

6. A gaming system as defined in claim 1, said gaming apparatus controller being programmed to cause said first subset of said plurality of gaming apparatuses to not be in said bonus state before causing said light devices of said second subset of said plurality of gaming apparatuses to be in said bonus state.

7. A gaming system as defined in claim 1, said gaming apparatus controllers being programmed to allow said player to decline to participate in said gaming system bonus game.

8. A gaming system as defined in claim 1, wherein said gaming apparatus controllers being programmed to allow said player to make a wager on the outcome of said gaming system bonus game.

9. A gaming system as defined in claim 1, wherein said plurality of gaming apparatuses are arranged in different geographic locations.

10. A gaming method comprising:

causing a video image representing a game to be generated, said video image representing one of the following games: video poker, video blackjack, video slots, video keno or video bingo, said video image comprising an image of at least five playing cards if said game comprises video poker, said video image comprising an image of a plurality of simulated slot machine reels if said game comprises video slots, said video image comprising an image of a plurality of playing cards if said game comprises video blackjack, said video image comprising an image of a plurality of keno numbers if said game comprises video keno, and said video image comprising an image of a bingo grid if said game comprises video bingo;

determining a value payout associated with an outcome of said game represented by said video image;

causing a group bonus game to be initiated on a plurality of gaming apparatuses, each of said plurality of gaming apparatuses having a light device having at least one independently operable light, wherein the bonus game is initiated by said plurality of gaming apparatuses;

determining which of said plurality of gaming apparatuses is eligible to participate in said group bonus game, wherein the number of a plurality of stages is equal to one less than the number of the eligible gaming apparatuses;

causing a first subset of said light devices of said eligible gaming apparatuses to be in a bonus state in at least a first stage of the plurality of stages by generating a bonus indicia on said light devices of said eligible gaming apparatuses in said first subset;

causing the first subset of said light devices of said eligible gaming apparatuses to extinguish the bonus indicia on said light devices of said eligible gaming apparatuses in said first subset;

causing a second subset of said light devices of said eligible gaming apparatuses to be in a bonus state in the at least first stage of the plurality of stages by generating a bonus indicia on said light devices of said eligible gaming apparatuses in said first subset;

causing the second subset of said light devices of said eligible gaming apparatuses to extinguish the bonus indicia on said light devices of said eligible gaming apparatuses on said second subset;

re-determining eligibility of said plurality of gaming apparatuses during the bonus game, where the total number of eligible gaming apparatuses decreases for each stage after the at least first stage of the plurality of stages of the bonus game and prior to an outcome of the bonus game;

continuing generating and extinguishing the bonus indicia on said light devices on each re-determined eligible gaming apparatus of the plurality of gaming apparatuses during each subsequent stage of the plurality of stages operating in succession to one another;

concluding play of said group bonus game when the number of eligible gaming apparatuses is less than a predetermined number, wherein the predetermined number is always greater than or equal to one; and determining a value payout associated with the outcome of said group bonus game.

11. A gaming method as defined in claim 10, additionally comprising:

causing the group bonus game to be initiated on the eligible gaming apparatuses as a result of determining a value payout associated with an outcome of said game represented by said video image.

12. A gaming method as defined in claim 10, additionally comprising:

determining which of said plurality of gaming apparatuses is eligible to participate in said group bonus game by determining which of said plurality of gaming apparatuses contains a value wager.

13. A gaming method as defined in claim 10, wherein the plurality of said gaming apparatuses are located in geographical different locations.

14. A gaming method as defined in claim 10, additionally comprising:

said plurality of gaming apparatuses being physically arranged in the shape of a polygon; and causing said first subset of said light devices to not be in a bonus state before causing said second subset of said light devices to be in a bonus state, wherein said second subset of said light devices is immediately adjacent said first subset of said light devices.

15. A gaming method as defined in claim 10, wherein said bonus state comprises a bonus image displayed on said light device.

16. A gaming method as defined in claim 10, wherein said bonus state comprises the illumination of said at least one independently operable light of said light device.

17. A gaming system for generating a gaming system bonus game, said gaming system comprising:

a plurality of gaming apparatuses, each of said gaming apparatuses comprising:

a display unit that is capable of generating video images;

a value input device;

a light bezel having at least one independently operable light;

a gaming apparatus controller operatively coupled to said display unit, said light bezel, and said value input device, said gaming apparatus controller comprising a processor and a memory operatively coupled to said processor, said gaming apparatus controller being programmed to allow a player to make a wager, said gaming apparatus controller being programmed to cause a video image to be generated on said display unit, said video image representing a game, said gaming apparatus controller being programmed to determine, after said video image has been displayed, a value payout associated with an outcome of said game represented by said video image; and a gaming system controller operatively coupled to each of said plurality of gaming apparatus, said gaming system controller comprising a processor and a memory;

said gaming system controller being programmed to initiate a gaming system bonus game comprising a plurality of stages that operate in succession to one another, wherein said gaming system bonus game is initiated by said gaming system controller in response to a signal issued by an initiating gaming apparatus of said plurality of gaming apparatuses to said gaming system controller without being polled by said gaming system controller, said gaming system controller being programmed to determine eligibility of each of said plurality of gaming apparatus to participate in said gaming system bonus game, wherein the number of the plurality of stages is equal to one less than the number of the eligible gaming apparatuses, said gaming system controller being programmed to determine an outcome of said gaming system bonus game, said gaming system controller being programmed to cause said light bezels of a first subset of said eligible gaming apparatuses to be in a bonus state in at least a first stage of the plurality of stages by generating a bonus indicia on said light bezels of said eligible gaming apparatuses in said first subset, said gaming system controller being program to extinguish the bonus indicia on said light bezels of said eligible gaming apparatuses in said first subset, said gaming system controller being programmed to cause said light bezels of a second subset of said eligible gaming apparatuses to be in a bonus state in the at least first stage of the plurality of stages by generating the bonus indicia on said light bezels of said eligible gaming apparatuses on said second subset, said gaming system controller being programmed to extinguish the bonus indicia on said light bezels of said eligible gaming apparatuses on said second subset, said gaming system controller being programmed to re-determine eligibility of said plurality of gaming apparatuses at the conclusion of each stage, where the total number of eligible gaming apparatuses decreases for each stage after the at least first stage of the plurality of stages, said gaming system controller being programmed to continue generating and extinguishing the bonus indicia on said light bezels on each re-determined eligible gaming apparatus of the plurality of gaming apparatuses during each subsequent stage of the plurality of stages that operate in succession to one another, said gaming system controller being programmed to conclude play of said gaming system bonus game by only generating the bonus indicia on a predetermined number of gaming apparatuses of said re-determined eligible gaming apparatuses determined to be a winning gaming apparatus of said gaming system bonus game, wherein the predetermined number of gaming apparatuses is always greater than or equal to one, and said gaming system controller being programmed to determine a value payout associated with the outcome of said gaming system bonus game, and to award the value payout to each of said initiating gaming apparatus and said winning apparatus.

18. A gaming system as defined in claim 17, wherein said bonus state comprises a bonus image displayed on said light bezel.

19. A gaming system as defined in claim 17, wherein said bonus state comprises the illumination of said at least one independently operable light of said light bezel.

20. A gaming system as defined in claim 17, wherein said plurality of gaming apparatuses are arranged in a generally circular physical arrangement, and wherein said second subset of said plurality of gaming apparatuses is adjacent said first subset of said plurality of gaming apparatuses.

21. A gaming system as defined in claim 17, wherein said first subset of said plurality of gaming apparatuses and said second subset of said plurality of gaming apparatuses are exclusive of each other.

22. A gaming system as defined in claim 17, said gaming apparatus controller being programmed to cause said first subset of said plurality of gaming apparatuses to not be in said bonus state before causing said light bezels of said second subset of said plurality of gaming apparatuses to be in said bonus state.

23. A gaming system as defined in claim 17, said gaming apparatus controllers being programmed to allows said player to decline to participate in said gaming system bonus game.

24. A gaming system as defined in claim 17, wherein said gaming apparatus controllers being programmed to allow said player to make a wager on the outcome of said gaming system bonus game.

25. A gaming system as defined in claim 17, wherein said plurality of gaming apparatuses are arranged in different geographic locations.

26. A gaming system for generating a gaming system bonus game, said gaming system comprising:

a plurality of gaming apparatuses, each of said gaming apparatuses comprising:

a display unit that is capable of generating video images;

a value input device;

a light device having at least on independently operable light;

a gaming apparatus controller operatively coupled to said display unit, said light device, and said value input device, said gaming apparatus controller comprising a processor and a memory operatively coupled to said processor, said gaming apparatus controller being programmed to allow a player to make a wager, said gaming apparatus controller being programmed to cause a video image to be generated on said display unit, said video image representing a game, said gaming apparatus controller being programmed to determine, after said video image has been displayed, a value payout associated with an outcome of said game represented by said video image; and a gaming system controller operatively coupled to each of said plurality of gaming apparatuses, said gaming system controller comprising a processor and a memory;

said gaming system controller being programmed to initiate a gaming system bonus game, wherein said gaming system bonus game has a plurality of stages before play is concluded, and wherein said gaming system bonus game is initiated by said gaming system controller in response to a signal issued by said gaming apparatus controller to said gaming system controller without being polled by said gaming system controller, said gaming system controller being programmed to determine the eligibility of each of said plurality of gaming apparatuses to participate in each of said stages of said gaming system bonus game, wherein the number of the plurality of stages is equal to one less than the number of the eligible gaming apparatuses, said gaming system controller being programmed to determine an outcome each of said stages of said gaming system bonus game, said gaming system controller being programmed to cause light devices of a first subset of said eligible gaming apparatuses to be in a bonus state in at least a first stage of the plurality of stages by generating a bonus indicia on said light devices of said eligible gaming apparatuses in said first subset, said gaming system controller being program to extinguish the bonus indicia on said light devices of said eligible gaming apparatuses in said first subset, upon conclusion of the at least first stage of the plurality of stages, said gaming system controller being programmed to re-determine the eligibility of each of said plurality of gaming apparatuses to continue to participate in a next stage of said gaming system bonus game, where the eligibility of the next stage is at least one fewer gaming apparatus than each previous stage, resulting in progressively fewer gaming apparatuses participating in the gaming system bonus game during each subsequent stage of the plurality of stages that operate in succession to one another, upon conclusion of the plurality of stages, said gaming system controller being programmed to conclude play of said gaming system bonus game by only generating the bonus indicia on a predetermined number of gaming apparatuses of said re-determined eligible gaming apparatuses determined to be the winner of said gaming system bonus game, wherein the predetermined number of gaming apparatuses is always greater than or equal to one, and said gaming system controller being programmed to determine a value payout associated with the outcome of said gaming system bonus game, wherein the value payout is awarded only upon conclusion of said gaming system bonus game.

27. A gaming system as defined in claim 26, wherein said gaming system controller is programmed to cause said light devices of a first subset of said plurality of gaming apparatuses to be in a bonus state, said gaming system controller being programmed to cause said light devices of a second subset of said plurality of gaming apparatuses to be in a bonus state, where said bonus state comprises a bonus image displayed on said light device.

28. A gaming system as defined in claim 27, wherein said bonus state comprises the illumination of said at least one independently operable light of said light device.

29. A gaming system as defined in claim 27, wherein said plurality of gaming apparatuses are arranged in a generally circular physical arrangement, and wherein said second subset of said plurality of gaming apparatuses is adjacent said first subset of said plurality of gaming apparatuses.

30. A gaming system as defined in claim 27, wherein said first subset of said plurality of gaming apparatuses and said second subset of said plurality of gaming apparatuses are exclusive to each other.

31. A gaming system as defined in claim 27, said gaming apparatus controller being programmed to cause said first subset of said plurality of gaming apparatuses to not be in said bonus state before causing said light devices of said second subset of said plurality of gaming apparatuses to be in said bonus state.

32. A gaming system as defined in claim 16, said gaming apparatus controller being programmed to allow said player to decline to participate in said gaming system bonus game.

33. A gaming system as defined in claim 26, wherein said gaming apparatus controller being programmed to allow said player to make a wager on the outcome of said gaming system bonus game.

34. A gaming system as defined in claim 26, wherein said plurality of gaming apparatuses are arranged in different geographic locations.

35. A gaming system as defined in claim 26, wherein eligibility for each stage of gaming system bonus game is randomly determined.

36. A gaming system as defined in claim 26, wherein eligibility for each stage of gaming system bonus game is determined based on a player action.

37. A gaming system as defined in claim 26, wherein eligibility for each stage of gaming system bonus game is determined based on a player action in response to a bonus indicia displayed on the player's respective gaming apparatus.

* * * * *